(12) United States Patent
Iwata et al.

(10) Patent No.: US 7,909,448 B2
(45) Date of Patent: Mar. 22, 2011

(54) RECORDING HEAD, RECORDING UNIT, INK JET RECORDING APPARATUS, INK JET RECORDING METHOD, AND INK SET

(75) Inventors: Tetsu Iwata, Yokohama (JP); Fumiaki Fujioka, Kawasaki (JP); Shinichi Hakamada, Kawasaki (JP); Takashi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 11/860,172

(22) Filed: Sep. 24, 2007

(65) Prior Publication Data

US 2008/0136875 A1 Jun. 12, 2008

Related U.S. Application Data

(63) Continuation of application No. PCT/JP2007/062830, filed on Jun. 20, 2007.

(30) Foreign Application Priority Data

Jun. 22, 2006 (JP) ................................. 2006-172715

(51) Int. Cl.
*G01D 11/00* (2006.01)
(52) U.S. Cl. .......................... 347/100; 347/95; 347/85
(58) Field of Classification Search .................. 347/95, 347/96, 100, 101, 85; 106/31.6, 31.27, 31.13; 523/160
See application file for complete search history.

(56) References Cited

U.S. PATENT DOCUMENTS

| | | | |
|---|---|---|---|
| 4,794,409 A | 12/1988 | Cowger et al. | 346/140 R |
| 5,504,508 A | 4/1996 | Hashimoto | 347/24 |
| 5,782,967 A | 7/1998 | Shirota et al. | 106/31.58 |
| 5,790,157 A | 8/1998 | Higuma et al. | 347/85 |
| 5,833,743 A | 11/1998 | Elwakil | 106/31.27 |
| 6,113,679 A * | 9/2000 | Adkins et al. | 106/31.6 |

(Continued)

FOREIGN PATENT DOCUMENTS

CN 1321182 A 11/2001

(Continued)

OTHER PUBLICATIONS

International Preliminary Report on Patentability of International Application No. PCT/JP2007/062830 dated Jan. 8, 2009.

(Continued)

*Primary Examiner* — Matthew Luu
*Assistant Examiner* — Rut Patel
(74) *Attorney, Agent, or Firm* — Fitzpatrick, Cella, Harper & Scinto

(57) ABSTRACT

A recording head and a recording unit are provided achieving both the reliability of ejection stability and storage stability and the prevention of a new color mixing phenomenon. The recording head has ejection orifice lines each of which ejects each of the inks constituting an ink set. The plurality of inks is stored respectively in ink cartridges each having an ink storage portion being brought into a hermetically-closed state. At least three types of inks among the inks are different in specific gravity from one another, and at least two types of inks among the at least three types of inks are different in specific gravity by 0.020 or more. The ejection orifice lines are arranged so that the total sum of differences in specific gravities between the inks to be ejected from ejection orifice lines adjacent to each other among the inks to be ejected from the ejection orifice lines becomes minimal.

10 Claims, 9 Drawing Sheets

U.S. PATENT DOCUMENTS

| | | |
|---|---|---|
| 6,257,711 B1 | 7/2001 | Higuma et al. ............... 347/85 |
| 6,398,355 B1 | 6/2002 | Shirota et al. ............... 347/100 |
| 6,474,803 B1 | 11/2002 | Shirota et al. ............... 347/100 |
| 6,698,876 B2 | 3/2004 | Sato et al. .................. 347/100 |
| 6,854,836 B2 | 2/2005 | Ishinaga et al. ............. 347/85 |
| 6,929,362 B2 | 8/2005 | Takada et al. ............... 347/100 |
| 6,932,465 B2 | 8/2005 | Nito et al. ................... 347/96 |
| 6,935,732 B2 | 8/2005 | Takada et al. ............... 347/96 |
| 7,141,105 B2 | 11/2006 | Udagawa et al. .......... 106/31.49 |
| 7,144,449 B2 | 12/2006 | Udagawa et al. .......... 106/31.15 |
| 7,185,978 B2 | 3/2007 | Nagashima et al. ......... 347/100 |
| 7,195,340 B2 | 3/2007 | Nagashima et al. ......... 347/56 |
| 7,208,032 B2 | 4/2007 | Hakamada et al. ........ 106/31.27 |
| 7,276,112 B2 | 10/2007 | Tokuda et al. ............. 106/31.6 |
| 7,291,214 B2 | 11/2007 | Tsuji et al. ................ 106/31.8 |
| 7,297,203 B2 | 11/2007 | Takada et al. .............. 106/31.8 |
| 2003/0048336 A1 | 3/2003 | Kaga et al. |
| 2003/0210289 A1 | 11/2003 | Yoshiyama et al. ............ 347/7 |
| 2004/0217127 A1* | 11/2004 | Kimura et al. ................. 222/92 |
| 2004/0263554 A1 | 12/2004 | Kubo |
| 2005/0204955 A1 | 9/2005 | Nagashima et al. ....... 106/31.59 |
| 2005/0219341 A1 | 10/2005 | Nito et al. .................... 347/100 |
| 2006/0007288 A1 | 1/2006 | Takada et al. ............... 347/100 |
| 2006/0007289 A1 | 1/2006 | Nito et al. .................... 347/100 |
| 2006/0098067 A1 | 5/2006 | Imai et al. .................... 347/100 |
| 2006/0098068 A1 | 5/2006 | Hakamada et al. ........... 347/100 |
| 2006/0103704 A1 | 5/2006 | Hakamada et al. ........... 347/100 |
| 2007/0029522 A1 | 2/2007 | Udagawa et al. ........ 252/301.16 |
| 2007/0034114 A1 | 2/2007 | Udagawa et al. .......... 106/31.15 |
| 2007/0097155 A1 | 5/2007 | Imai et al. ......................... 347/1 |
| 2007/0097156 A1 | 5/2007 | Udagawa et al. ................. 347/1 |
| 2007/0134451 A1 | 6/2007 | Hakamada et al. ........ 428/32.38 |
| 2007/0188572 A1 | 8/2007 | Takayama et al. ............ 347/100 |
| 2007/0191508 A1 | 8/2007 | Nakagawa et al. ............ 523/160 |

FOREIGN PATENT DOCUMENTS

| | | |
|---|---|---|
| EP | 1 044 815 | 10/2000 |
| EP | 1 048 472 | 11/2000 |
| JP | 63-118260 | 5/1988 |
| JP | 2-000522 | 1/1990 |
| JP | 6-191061 | 7/1994 |
| JP | 7-60984 | 3/1995 |
| JP | 10-16222 | 1/1998 |
| JP | 2002-234183 | 8/2002 |
| JP | 2003-191489 | 7/2003 |
| JP | 2003-251821 | 9/2003 |
| WO | WO 00/20521 | 4/2000 |

OTHER PUBLICATIONS

International European Search Report of Application No. PCT/JP2007/062830 dated Feb. 20, 2009.

Jan. 8, 2010 Chinese Official Action in Chinese Patent Application No. 2007800010069 (with English-language translation).

May 21, 2010 European Search Report in European Patent Application No. 07767636.9.

* cited by examiner

Z1000   Z1001

Z1002

US 7,909,448 B2

RECORDING HEAD, RECORDING UNIT, INK JET RECORDING APPARATUS, INK JET RECORDING METHOD, AND INK SET

CROSS-REFERENCE TO RELATED APPLICATIONS

This application is a continuation of International Application No. PCT/JP2007/062830, filed Jun. 20, 2007, which claims the benefit of Japanese Patent Application No. 2006-172715, filed Jun. 22, 2006.

BACKGROUND OF THE INVENTION

1. Field of the Invention

This invention relates to a recording head having ejection orifice lines each of which ejects each of the plurality of inks constituting an ink set, stored in each of ink storage portions which is brought into a hermetically-closed state. This invention also relates to a recording unit having (i) ink cartridges having ink storage portions each of which stores therein each of the plurality of inks constituting an ink set and (ii) the recording head having ejection orifice lines each of which ejects each of the plurality of inks. This invention further relates to an ink jet recording apparatus, an ink jet recording method and an ink set which use the above recording head or recording unit.

2. Description of the Related Art

In ink jet recording apparatuses, it is required to supply ink stably from an ink cartridge to a recording head so as not to cause any leakage of the ink from the recording head or any lowering of recording performance because of excess ink supply.

In order for the ink supply to be stable, it has hitherto been studied to control the pressure of an ink storage portion in the ink cartridge by various methods. For example, a proposal has been made for a method in which water head pressure of the ink is prevented from being applied to the recording head (see Japanese Patent Application Laid-open No. 2002-234183). In addition, a proposal has been made for an ink storage portion the interior of which is so constituted as to have a porous member as a negative-pressure generating member (see Japanese Patent Applications Laid-open No. S63-118260, No. H02-000522 and No. H07-060984). A proposal has been further made for use of a pressure plate or a spring member as a negative-pressure generating member (see Japanese Patent Applications Laid-open No. 2003-191489 and No. 2003-251821).

The present inventors have studied the use of an ink cartridge having such an ink storage portion as stated below, as an ink cartridge suited for storing therein an ink containing a pigment as a coloring material (i.e., a pigment ink). Specifically, the inventors have studied the use of an ink cartridge not having any porous ink storing member. It is considered that such an ink cartridge can keep the pigment from sedimentation and that the amount of ink remaining in the ink cartridge after being used up can be reduced to an amount as small as possible. Further, the present inventors have made studies by using as an ink jet recording apparatus an ink jet recording apparatus on which the ink cartridge as stated above can be mounted in plurality.

The present inventors have conducted a so-called cleaning operation in which, when the ink jet recording apparatus is not operated, negative pressure is produced by means of a purging pump communicating with a cap with which ejection orifice lines of the recording head are covered, to discharge unnecessary ink from ejection orifices by purging. Thereafter, the inventors operated again the apparatus to eject an ink from the recording head. As a result, the inventors have found the following problem to come about. That is, the inventors have found that a phenomenon occurs in which a different ink comes into particular ink channels among the ink channels of a plurality of ejection orifice lines from which the inks have been discharged by purging through the same cap (this phenomenon is hereinafter referred to as "color mixing phenomenon").

When the present inventors first observed such a phenomenon, the inventors have considered that this color mixing phenomenon is a phenomenon caused by the same mechanism as in the color mixing phenomenon hitherto known in the art. More specifically, the ink attached to the surface of the recording head or the ink present inside the cap (such ink is hereinafter referred to as "ink residue") comes into ink channels due to capillary force exerted by the ink channels, so that a different ink comes into the vicinity of ejection orifices of the ink channels. They have considered in this way.

Accordingly, the present inventors have conducted operations in which the ink is ejected inside the cap before the recording is started (this operation is hereinafter referred to as "preliminary ejection"), which is conventionally conducted as a common method for avoiding the color mixing phenomenon. However, the color mixing phenomenon has by no means been resolved even when the number of ink droplets ejected in the preliminary ejection (the number of preliminary ejected droplets) is greatly increased as compared with the number of preliminary ejected droplets that is large enough to resolve the conventional color mixing phenomenon.

Accordingly, the present inventors have conducted several times the cleaning operation for the purpose of discharging all the ink remaining at the part inside the ink channels where the color mixing phenomenon has occurred. However, even though the cleaning operation was performed many times, the color mixing phenomenon was not resolved; instead, a serious degree of the color mixing phenomenon occurred, bringing about a result contrary to their expectations.

On the basis of the results stated above, the present inventors have studied in detail the color mixing phenomenon. As a result, the inventors have found the following. That is, the inventors have found that this color mixing phenomenon involved in the present invention is not the color mixing phenomenon conventionally observed in the vicinity of ejection orifices of ink channels or in the vicinity of ink channels in a common liquid chamber communicating with individual ejection orifices, but a new color mixing phenomenon such that a different ink comes into the insides of ink channels. Herein, the "common liquid chamber" refers to a common liquid chamber communicating, in common, with a plurality of ink channels which communicate respectively with a plurality of ejection orifices in the recording head from which ink is to be ejected. The "insides of ink channels" refer to the whole of the ink channels and common liquid chamber of the recording head and further ink supply paths through which ink is to be fed to the common liquid chamber from the ink storage portion of the ink cartridge.

Further, when the above color mixing phenomenon has occurred, the ink jet recording apparatus was left standing for a while after the cleaning operation has been conducted, in the state the ink is not ejected from the recording head. Thereafter, the inventors conducted again recording, where, in the beginning, the recording head ejected the ink that should originally be ejected from the ejection orifices. However, upon continuing the recording in that state for a while, an ink which is not the ink that should originally be ejected from the ejection orifices has suddenly been ejected. It has been found that such a new phenomenon has never been observed to occur. Then, the ink which is not the ink that should originally be ejected from the ejection orifices has been found to be the different ink stated above that has come into the insides of the ink channels. Further, as the lapsed time has increased during which the recording is not performed after the cleaning operation has been conducted, a phenomenon has occurred in which a different ink that had begun to come into particular ink channels comes into the insides of the ink channels. It has been found that, when such a state is brought about, the matter is far beyond the level of a color mixing phenomenon which can be resolved by somewhat increasing the number of preliminary ejection droplets or by other adjustments.

SUMMARY OF THE INVENTION

Accordingly, an object of the present invention is to provide a recording head, and a recording unit, which can achieve both the reliability of ejection stability and storage stability and the prevention of such a new color mixing phenomenon as stated above.

Another object of the present invention is to provide an ink jet recording apparatus and an ink jet recording method which use the above recording head or recording unit.

Still another object of the present invention is to provide an ink set which can prevent such a new color mixing phenomenon as stated above.

The above objects can be achieved by the present invention described below. That is, the recording head according to the present invention includes ejection orifice lines each of which ejects each of the plurality of inks constituting an ink set; the plurality of inks being stored respectively in ink cartridges each having an ink storage portion which is brought into a hermetically-closed state; at least three types of inks among the plurality of inks being different in specific gravity from one another; at least two types of inks among the at least three types of inks being different in specific gravity by 0.020 or more; and the ejection orifice lines being arranged so that the total sum of differences in specific gravities between the inks to be ejected from the ejection orifice lines adjacent to each other among the plurality of inks to be ejected from the ejection orifice lines becomes minimal.

The recording unit according to another embodiment of the present invention includes (i) ink cartridges having ink storage portions each of which stores therein each of the plurality of inks constituting an ink set and (ii) a recording head having ejection orifice lines each of which ejects each of the plurality of inks; the ink storage portions being brought into a hermetically-closed state; at least three types of inks among the plurality of inks being different in specific gravity from one another; at least two types of inks among the at least three types of inks being different in specific gravity by 0.020 or more; and the ejection orifice lines being arranged so that the total sum of differences in specific gravities between the inks to be ejected from ejection orifice lines adjacent to each other among the plurality of inks to be ejected from the ejection orifice lines becomes minimal.

The ink jet recording apparatus according to another embodiment of the present invention is provided with a recording unit including (i) ink cartridges each having an ink storage portion which stores therein an ink and (ii) a recording head for ejecting the ink, wherein the recording unit has the constitution as described above.

The ink jet recording method according to a further embodiment of the present invention includes ejecting inks constituting an ink set by an ink jet method, wherein a plurality of inks are ejected from a recording head constituting the recording unit constituted as described above.

The ink set according to a still further embodiment of the present invention includes a plurality of inks to be ejected from a recording head having ejection orifice lines; the inks constituting the ink set being stored respectively in ink cartridges each having an ink storage portion which is brought into a hermetically-closed state; at least three types of inks among the plurality of inks being different in specific gravity from one another; at least two types of inks among the at least three types of inks being different in specific gravity by 0.020 or more; and the ejection orifice lines being arranged so that the total sum of differences in specific gravities between the inks to be ejected from ejection orifice lines adjacent to each other among the plurality of inks to be ejected from the ejection orifice lines becomes minimal.

According to the present invention, a recording head and a recording unit can be provided achieving both the reliability of ejection stability and storage stability and the prevention of the color mixing phenomenon even when ink cartridges each having an ink storage portion which is brought into a hermetically-closed state is used. According to another embodiment of the present invention, an ink jet recording apparatus and an ink jet recording method can be provided using the above recording head or recording unit. According to another embodiment of the present invention, an ink set can be provided preventing the new color mixing phenomenon.

Further features of the present invention will become apparent from the following description of exemplary embodiments with reference to the accompanying drawings.

DESCRIPTION OF THE EMBODIMENTS

Figure 1:
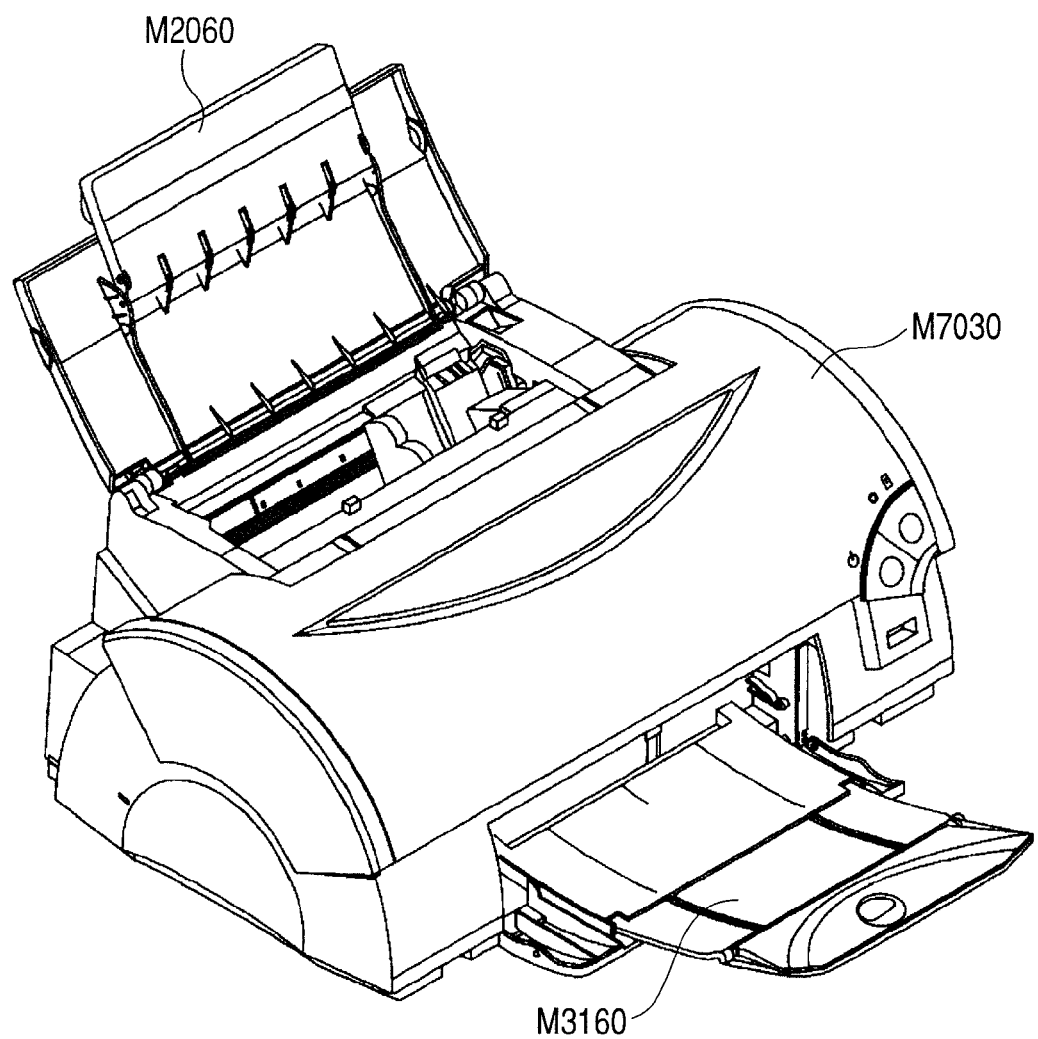
FIG. 1 is a perspective view of an ink jet recording apparatus.

The present invention is described below in detail by giving preferred embodiments. Herein, the specific gravities of inks, water-soluble organic solvents, coloring materials, and the viscosities and surface tensions of inks can be measured at 25° C. by a conventional method. In EXAMPLES given later, the specific gravities of inks, water-soluble organic solvents and coloring materials were measured at 25° C. by using a float type specific gravity hydrometer (trade name: Standard Specific Gravity Hydrometer; manufactured by Tech-Jam Co., Ltd.). The viscosities of inks were measured at 25° C. by using RE80L Type Viscometer (manufactured by Toki Sangyo Co., Ltd.). The surface tensions of inks were measured at 25° C. by using an automatic surface tension meter CBVP-Z (manufactured by Kyowa Interface Science Co., Ltd.). Further, in the present invention, the value of difference is taken as an absolute value.

In order to elucidate the mechanism by which the color mixing phenomenon having never been observed, as stated above, takes place, the present inventors have conducted various studies. First, the present inventors have studied what conditions should be satisfied for causing such a color mixing phenomenon. As a result, the inventors have found that the color mixing phenomenon remarkably occurs when the following conditions are satisfied. The conditions are as follows: (1) among the plurality of inks in an ink jet recording apparatus, at least two types of inks ejected from the ejection orifices adjacent to each other are different in specific gravity by 0.020 or more; and (2) the at least two types of inks are stored respectively in ink cartridges whose ink storage portions storing the inks therein are brought into a hermetically-closed state.

Where the above conditions (1) and (2) are satisfied, an ink having a relatively small specific gravity comes into the insides of the ink channels through which an ink having a relatively large specific gravity is to be ejected. As a result, it has been found that the color mixing phenomenon involved in the present invention is brought about in the insides of the ink channels (this phenomenon is hereinafter referred to as "first color mixing phenomenon").

The wording "ink storage portion which is brought into a hermetically-closed state" is used to mean that a state can be brought about in which, at the time of cleaning operation, there is substantially no part where the ink storage portion comes into contact with the atmosphere. Specifically, it means that the part where the ink storage portion comes into contact with the atmosphere is only an ink supply opening, namely, the ink stored in the ink storage portion communicates with the atmosphere only through an ink supply opening.

More specifically, the ink storage portion is set up in the following way. The ink jet recording apparatus is designed so that the ejection orifices of the recording head can be covered with a cap in order to prevent the ink from evaporating, and the cap is so set up as to communicate with a waste ink absorber through a tube. While the cleaning operation is conducted, the ejection orifices of the recording head come into touch with the cap. The tube communicating with the cap communicates with the waste ink absorber, but the interior of the tube is filled with the ink during the cleaning operation. Hence, the ink storage portion in which the part where the ink storage portion comes into contact with the atmosphere is only the ink supply opening is brought into a hermetically-closed state. In addition, the cap is so set up as to cap by itself the ejection orifice lines all together to effect the cleaning operation, i.e., purging.

The cause of occurrence of the first color mixing phenomenon upon satisfying the conditions (1) and (2) is unclear. The present inventors are presuming the cause to be as stated below. In an ink cartridge in which a pressure plate or a spring member is used as a negative-pressure generating member, the ink communicates with the atmosphere through only the ink supply opening. While the cleaning operation is carried out in an ink jet recording apparatus on which such an ink cartridge is mounted, the ink storage portion is brought into a hermetically-closed state. On the other hand, after the cleaning operation has been completed, the ink storage portion again comes to be open.

In the ink cartridge set up in this way, the variation of negative pressure in the insides of ink channels of the recording head (such variation is hereinafter referred to as "ripple") is larger than that in an ink cartridge which is set up so that the ink storage portion is always in contact with the atmosphere, e.g., an ink cartridge having an atmosphere communication opening in addition to the ink supply opening. Specifically, such an ink cartridge having an atmosphere communication opening in addition to the ink supply opening has a ripple of about 10 mmHg. On the other hand, the ink cartridge having the ink storage portion which is brought into a hermetically-closed state has a ripple of from about 20 mmHg to about 30 mmHg. The present inventors presume that, because of such a large ripple, the force of drawing the ink residue into the insides of ink channels is abruptly increased, and this is one of major causes of occurrence of the first color mixing phenomenon.

As a result of studies made by the present inventors, the following phenomenon has been found to occur when, among the ink cartridges mounted on an ink jet recording apparatus, an ink cartridge is present in which the quantity of ink remaining therein is extremely smaller than that in other ink cartridge(s). More specifically, it has been found that the ink channels of a recording head which communicate with the ink cartridge in which the quantity of ink remaining therein is small have a larger ripple before and after the cleaning operation, than the ink channels of the recording head which communicate with other ink cartridges. As a result, the ink residue is especially remarkably drawn into the insides of ink channels communicating with the ink cartridge in which the quantity of ink remaining therein is small.

The relationship between the differences in specific gravities between a plurality of inks and the first color mixing phenomenon is explained below, which is most characteristic of the present invention. As stated above, such a phenomenon that the ink residue is drawn into the insides of ink channels remarkably occurs when the ink cartridge whose ink storage portion is brought into a hermetically-closed state is used. In this case, where an ink residue having a smaller specific gravity than the specific gravity of an ink originally present in the insides of ink channels is drawn into the insides of the ink channels, such a phenomenon as stated below occurs in the insides of the ink channels.

When the first color mixing phenomenon occurs, the ink residue is present in the insides of ink channels, unlike the color mixing phenomenon conventionally observed in the vicinity of ejection orifices of ink channels or in the vicinity of ink channels in a common liquid chamber communicating with individual ejection orifices (hereinafter referred to as "second color mixing phenomenon"). However, in the first color mixing phenomenon and second color mixing phenomenon, the state of the ink residue present in ink channels immediately after the cleaning operation is considered to be substantially the same. That is, the ink residue is distributed over broader range in the insides of ink channels in the case where the first color mixing phenomenon occurs.

However, in the case where the first color mixing phenomenon occurs, the influence of the movement of a fluid due to the ripple begins to decrease, where the movement of a fluid due to the difference in specific gravity between a plurality of inks, i.e., gravity becomes predominant. More specifically, an ink having a large specific gravity and being originally present in the insides of ink channels moves to the vicinity of ejection orifices of the ink channels. An ink residue having a small specific gravity among ink residues drawn into the ink channels moves up to the insides of ink channels, in particular, the ink supply paths through which the ink is to be fed from the ink storage portion to the common liquid chamber in an ink cartridge. Thus, the concentration distribution of coloring materials comes to be present in the insides of ink channels of individual inks. As a result, if the ink jet recording is left standing for a while after the cleaning operation has been conducted, in the state no ink is ejected from ejection orifices, and thereafter the recording is again performed, an ink which should be ejected from particular ejection orifices is ejected. However, if the recording is continued in this state for a while, an ink which should not be ejected from those ejection orifices, i.e., a different ink having been drawn into the insides of the ink channels is suddenly ejected. It is presumed that such a phenomenon that has never been observed has occurred. Thus, as being clear also from what has been stated above, the first color mixing phenomenon is quite different from the second color mixing phenomenon known conventionally.

The present inventors have further ascertained that the first color mixing phenomenon stated above remarkably occurs when inks (pigment inks) containing pigments as coloring materials are used, as compared with inks (dye inks) containing dyes as coloring materials. The reason therefor is unclear, but the present inventors presume the reason to be as stated below. That is, in the pigments, in particular, polymer dispersion type pigments described later, coloring materials themselves, i.e., the pigments or pigment dispersions themselves are more different in specific gravity than the dyes. Hence, where such pigment inks are used, it follows that the movement of coloring materials due to the difference in specific gravity between coloring materials comes about in the insides of ink channels, in addition to the movement of fluids due to the difference in specific gravity between a plurality of inks, so that the first color mixing phenomenon is considered to more remarkably occur. The difference in specific gravity between a plurality of inks lessens with the lapse of time, whereas the difference in specific gravity between coloring materials does not lessen even with the lapse of time. Hence, a state is created in which the movement of coloring materials due to the difference in specific gravity between the coloring materials always occurs in the insides of ink channels as long as the flowability of liquids therein is not lost. The coloring materials in ink residues having come into the insides of ink channels come more deeply into the insides of the ink channels as the lapsed time is increased during which the recording is not performed after the cleaning operation has been conducted. Such a phenomenon is presumed to be caused by the difference in specific gravity between these coloring materials.

As a result of the studies made by the present inventors in order to prevent the above first color mixing phenomenon, the present inventors have found that the problems discussed above can be resolved by allowing the properties of the plurality of inks constituting an ink set to have the following relationship. That is, it has been found that, where ink cartridges whose ink storage portions are brought into a hermetically-closed state are used as ink cartridges each of which stores each of the plurality of inks constituting an ink set, the following constitution should be satisfied. It has been found that, among the plurality of inks constituting an ink set, the difference in specific gravity between a first ink having the largest specific gravity and a second ink having the smallest specific gravity is set to be small, whereby the first color mixing phenomenon can be prevented from occurring.

However, in the pigment inks, it is difficult to reduce the differences in specific gravities between the respective inks so that they are negligible. For example, the specific gravities of inks can be controlled by properly determining the types and contents of components constituting the inks. In the case of pigment inks in which pigments are dispersed in aqueous mediums by using polymers as dispersing agents, the specific gravities of inks can be controlled also by properly determining the type of polymer, the content of the polymer, etc. However, the pigments differ in surface state and particle diameter depending on their types. Accordingly, when the inks containing pigments as the coloring materials are used, the types of dispersing agents and a water-soluble organic solvent and their contents must be optimized in accordance with the properties of the pigments. Further, taking into account the reliability of the dispersion stability of pigments (i.e., storage stability of inks) and the ejection stability of inks, the types and contents of components constituting the inks are limitative to a certain extent. Thus, it is difficult in some cases that the specific gravities of all inks constituting an ink set are uniformised at entirely the same value. Specifically, it has been found that it is very difficult to control the differences in specific gravities between all the inks constituting an ink set so as to be less than 0.020 while maintaining the storage stability and ejection stability at excellent levels.

Figure 9:
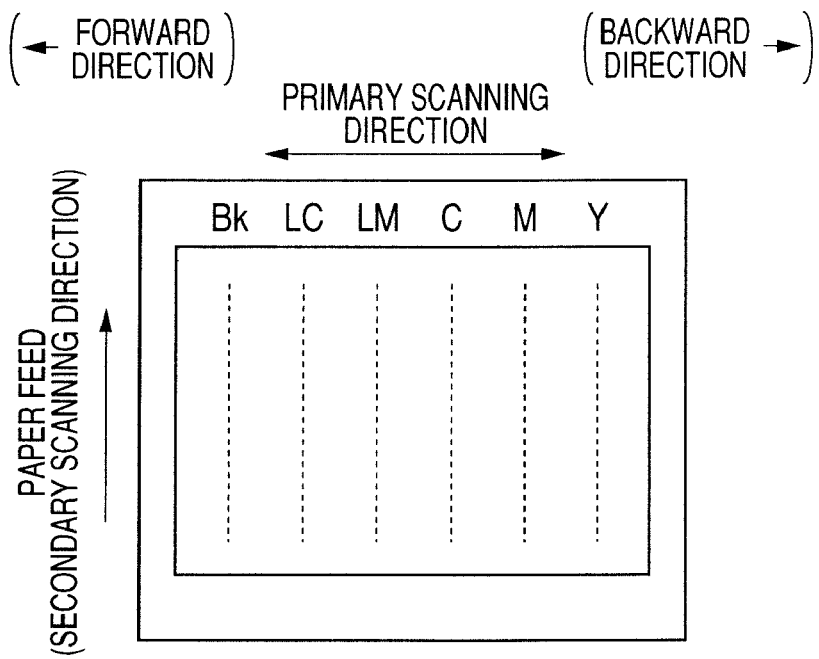
FIG. 9 is a diagrammatic view showing an example of the construction of a recording head.

Accordingly, for the purpose of finding how to prevent the first color mixing phenomenon by reducing the number of preliminary ejection to be as small as possible when the differences in specific gravities between the plurality of inks constituting an ink set are 0.020 or more, the present inventors have made studies as follows. In FIG. 9, Bk, LC, LM, C, M and Y denote ejection orifice lines which eject a black ink, a light-cyan ink, a light-magenta ink, a cyan ink, a magenta ink and a yellow ink, respectively.

Specifically, the present inventors have made studies using a recording head having six types of ejection orifice lines as shown in FIG. 9 and using three types of inks which are different in specific gravity from one another. More specifically, the inventors have made a comparison concerning the relationship between the order in which the three types of inks are disposed respectively at the positions of C, M and Y and the extent to which the first color mixing phenomenon occurs depending on such a disposition of the inks. As a result, it has been found that as compared with a case in which the first ink having the largest specific gravity or the second ink having the smallest specific gravity is disposed at the position of M, the first color mixing phenomenon can be better prevented when the ink having an intermediate specific gravity (hereinafter referred to as "the third ink") is disposed at the position of M.

Further, using four types of inks which are different in specific gravity from one another, the present inventors have made a comparison concerning the relationship between the order in which the four types of inks are disposed respectively at the positions of LM, C, M and Y and the extent to which the first color mixing phenomenon occurs depending on such a disposition of the inks. As a result, it has been found that the first color mixing phenomenon can remarkably be prevented when the inks are disposed in the order of from an ink having a larger specific gravity to an ink having a smaller specific gravity and when the inks are disposed in the order of from an ink having a smaller specific gravity to an ink having a larger specific gravity.

These results show that, as the ejection orifice lines are closer to one another, the differences in specific gravities between the respective inks more strongly influence the extent to which the first color mixing phenomenon occurs. That is, it is considered that the differences in specific gravities between the inks ejected from ejection orifice lines adjacent to each other most strongly influence the extent to which the first color mixing phenomenon occurs.

On the basis of the finding stated above, the present inventors have made studies. As a result, it has been found that it is necessary to satisfy the following constitution. That is, the ink cartridges whose ink storage portions is brought into a hermetically-closed state are used as ink cartridges each of which stores therein the plurality of inks constituting an ink set, and the ink set is set up so that the plurality of inks further have the following relationship. That is, where at least three types of inks among the plurality of inks are different in specific gravity from one another and at least two types of inks among the at least three types of inks are different in specific gravity by 0.020 or more, it is necessary to satisfy the following constitution. That is, it is necessary for the ejection orifice lines to be arranged so that the total sum of differences in specific gravities between the inks to be ejected from ejection orifice lines adjacent to each other among the plurality of inks constituting the ink set becomes minimal. Such a constitution has been found to enable the reliability of ejection stability and storage stability to be achieved at high levels and enable the first color mixing phenomenon to be prevented with the number of preliminary ejection droplets as small as possible. Thus, the inventors have accomplished the present invention.

As a result of studies further made by the present inventors, it has been found that it is more preferable that the differences in specific gravities between the inks to be ejected from ejection orifice lines adjacent to each other are less than 0.020. This enables the first color mixing phenomenon to be more effectively prevented.

For example, where inks constituting the ink set are of three types, it follows that there are two combinations for two types of inks to be ejected from the ejection orifice lines adjacent to each other. In this case, it is preferable that the difference in specific gravity between two types of inks in each of two combinations is less than 0.020. Similarly, where the inks constituting the ink set are of four or more types, it is preferable that the difference in specific gravity between two types of inks in each of three or more combinations is less than 0.020. Also in the case where the inks constituting the ink set are of five or more types, it is preferable that the difference in specific gravity between two types of inks to be ejected from the ejection orifice lines adjacent to each other is less than 0.020 in all the combinations.

In addition, the present inventors have made studies by using ink cartridges whose ink storage portions are so set up as to come in contact with the atmosphere, e.g., ink cartridges having atmosphere communication openings in addition to ink supply openings. As a result, the following has been found. That is, a plurality of inks different in specific gravity by 0.020 or more are filled respectively into the above ink cartridges, and, after the cleaning operation has been conducted, the ink jet recording apparatus is left standing for a while in the state any ink is not ejected from the ejection orifices, and thereafter the recording is performed again. However, in this case, the first color mixing phenomenon has been found not to occur.

This fact can be said to support the following. That is, the ripple before and after the cleaning operation differs between the case of using the ink cartridges having atmosphere communication openings in addition to ink supply openings and the case of using the ink cartridges whose ink storage portions is brought into a hermetically-closed state. Specifically, the ripple before and after the cleaning operation is relatively larger in the case of using the ink cartridges whose ink storage portions are brought into a hermetically-closed state. Hence, where these two types of ink cartridges are used, the movement of fluids due to the differences in specific gravities between a plurality of inks in the insides of ink channels differs in its extent, which influences the occurrence of the first color mixing phenomenon.

In general, the movement of fluids due to the difference in specific gravity between a plurality of inks is considered to be a phenomenon that comes about without regard to the value of the ripple. However, making a judgment from the above fact, it is considered that the movement of fluids due to the difference in specific gravity is not brought about until the rate of the movement of fluids due to a ripple having a value larger than a certain value comes to be present.

As a result of studies made by the present inventors, it has been found that when the plurality of inks constituting an ink set each have a specific gravity of 1.030 or more, the first color mixing phenomenon can be more effectively prevented from occurring. If the plurality of inks constituting an ink set each have a specific gravity of less than 1.030, the movement rate of fluids due to a large ripple before and after the cleaning operation is increased when ink residues are drawn into the insides of ink channels. As a result, the ink residues having been drawn into the insides of ink channels come to easily move into the insides of ink channels. Therefore, as compared with the case in which the plurality of inks constituting an ink set each have a specific gravity of 1.030 or more, the second color mixing phenomenon occurs more seriously in some cases and it may be necessary to increase the number of preliminary ejection droplets. Taking into account the reliability of ejection stability and anti-sticking properties of the inks, it is preferable that the inks constituting an ink set each have a specific gravity of 1.100 or less, and more preferably 1.065 or less. It is particularly preferable that all the inks constituting an ink set each have a specific gravity of 1.030 or more and 1.100 or less, and more preferably from 1.041 or more to 1.065 or less.

It is further preferable that in the inks to be ejected from ejection orifice lines adjacent to each other, the flow channel resistance in recording head through which an ink having a relatively large specific gravity is ejected is made larger than the flow channel resistance in recording head through which an ink having a relatively small specific gravity is ejected. Thereby, when conducting the cleaning operation, it is possible to make the volume of the ink which has a relatively large specific gravity and is purged from the ejection orifices and discharged, smaller than the volume of the ink which has a relatively small specific gravity and is purged from the ejection orifices and discharged. As a result, the ripple in the recording head through which the ink having a relatively large specific gravity is ejected becomes smaller than the ripple in the recording head through which the ink having a relatively small specific gravity is ejected, so that ink residues can be kept from being drawn into the insides of ink channels through which the ink having a relatively large specific gravity is to be ejected. Further, in the insides of ink channels through which the ink having a relatively large specific gravity is ejected, the movement of a fluid due to the ripple can be prevented, and hence the movement of a fluid due to the difference in specific gravity between a plurality of inks can be prevented. As a result, it is considered that the effect of preventing the first color mixing phenomenon can remarkably be obtained.

Various methods are available as means for controlling the flow channel resistance in the recording head. In the present invention, the viscosity of ink may be controlled to properly adjust the flow channel resistance in the recording head. Specifically, it is preferable that in inks to be ejected from ejection orifice lines adjacent to each other, the viscosity of the ink having a relatively large specific gravity is made larger than the viscosity of the ink having a relatively small specific gravity. By setting the relationship between the specific gravity and viscosity of the inks in this way, the flow channel resistance in the recording head through which the ink having a relatively large specific gravity is ejected can be made larger than the flow channel resistance in the recording head through which the ink having a relatively small specific gravity is ejected.

For example, where the inks constituting the ink set are of three types, it follows that there are two combinations for the two types of inks to be ejected from the ejection orifice lines adjacent to each other. In this case, it is preferable that the relationship between the specific gravity and viscosity of two inks in each of the two combinations satisfies the above conditions. Similarly, where the inks constituting the ink set are of four or more types, it is preferable that the relationship between the specific gravity and viscosity of two inks in each of three or more combinations satisfies the above conditions. Also in the case where the inks constituting the ink set are of five or more types, it is preferable that the relationship between the specific gravity and viscosity of two inks in all the combinations of two types of inks to be ejected from ejection orifice lines adjacent to each other satisfies the above conditions.

In the inks to be ejected from ejection orifice lines adjacent to each other, the difference in viscosity between the ink having a relatively large specific gravity and the ink having a relatively small specific gravity is somewhat varied depending on the constitution of ink channels, and is preferably set in the following way. Specifically, the viscosity of the ink having a relatively large specific gravity is preferably made larger by 10% or more, and more preferably 15% or more, than the viscosity of the ink having a relatively small specific gravity. However, taking into account the reliability of ejection stability and storage stability of the inks, it is preferable that the inks constituting an ink set have a viscosity of 2.0 mPa·s or more and 5.0 mPa·s or less.

Further, for the purpose of finding how to more effectively prevent the first color mixing phenomenon, the present inventors have made studies as reported below.

Figure 11A:
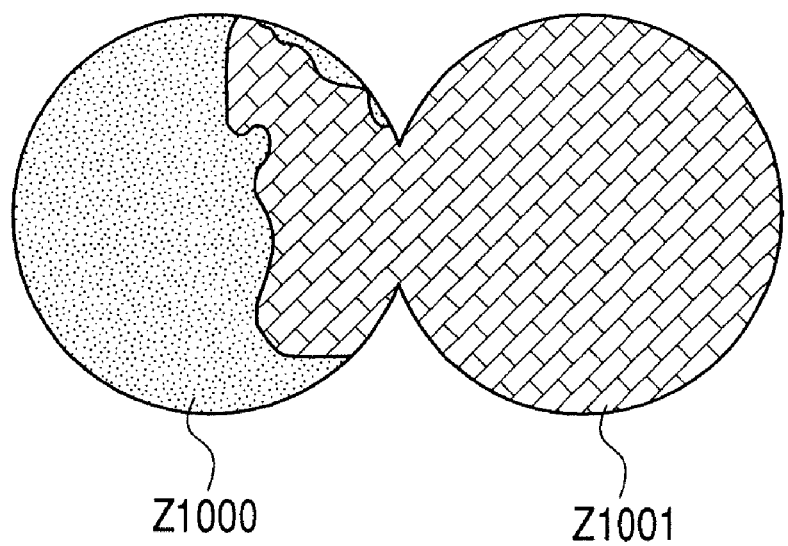
FIGS. 11A and 11B are diagrammatic views showing how two types of inks behave when they come into contact with each other.
Figure 11B:
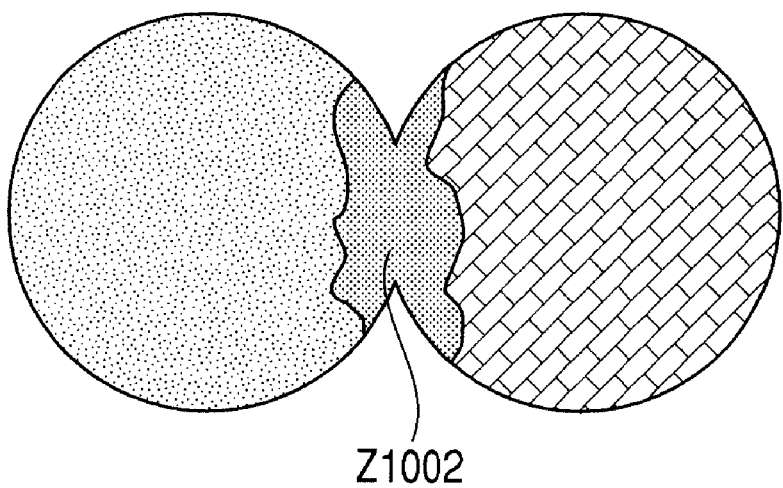

In general, where two types of liquids come into contact with each other, the state of their dispersion is grouped into the following two patterns. This is described below with reference to FIGS. 11A and 11B, which are diagrammatic views showing how two types of liquids behave when they come into contact with each other. First, the first pattern is such that, as shown in FIG. 11A, one liquid (liquid 2: Z1001) spreads one-sidedly into the other liquid (liquid 1: Z1000). Next, the second pattern is such that, as shown in FIG. 11B, liquids act to mutually diffuse into each other, and hence, become in a state of liquid (Z1002) in which these liquids are mixed at the boundary part where they come in contact with each other. In this case, when these two types of liquids are inks, they come to be in such a state that the inks have spread at the boundary part where they come in contact with each other. The causes of occurrence of such two patterns of phenomena can be variously considered. For example, there may be a case in which two types of liquids which are different in surface tension are brought into contact with each other and a case in which two types of liquids which are substantially equal in surface tension are brought into contact with each other. The case where two types of liquids different in surface tension are brought into contact with each other is as shown in FIG. 11A. The case where two types of liquids substantially equal in surface tension are brought into contact with each other is as shown in FIG. 11B. These phenomena can be ascertained by, e.g., observing the behavior of two types of inks which have been dropped in the same quantity in a laboratory dish or the like to come into contact with each other.

Accordingly, the present inventors have made studies with the aim of more effectively preventing the first color mixing phenomenon by utilizing the phenomena stated above. More specifically, an ink set is set up so that, in the inks to be ejected from ejection orifice lines adjacent to each other among the plurality of inks constituting the ink set, the surface tension of the ink having a relatively large specific gravity is made smaller than the surface tension of the ink having a relatively small specific gravity. Setting up the ink set in this way, the inventors have made studies with such expectation that an ink residue is pulled toward ink channels through which the ink having a relatively large specific gravity is to be ejected. As a result, it has been found that as compared with a case in which the surface tensions of the inks are not so set as to have the above relationship, the first color mixing phenomenon can be prevented with a smaller number of preliminary ejection droplets in the case where the surface tension of the ink having a relatively large specific gravity is smaller than the surface tension of the ink having a relatively small specific gravity.

As a result of the studies made by the present inventors on the basis of the above finding, it has been found that it is preferable to satisfy the following constitution. That is, in the inks to be ejected from ejection orifice lines adjacent to each other, the surface tension of the ink having a relatively large specific gravity is made smaller than the surface tension of the ink having a relatively small specific gravity. It has been found that when employing such a constitution, the reliability of ejection stability and storage stability can be achieved at high levels and the first color mixing phenomenon can be more effectively prevented.

In the present invention, it is preferable that the inks constituting the ink set have a surface tension of 25.0 mN/m or more and 50.0 mN/m or less, and more preferably 25.0 mN/m or more and 45 mN/m or less.

In the present invention, the specific gravity, viscosity and surface tension of the inks can be controlled by properly determining the types and contents of components constituting the inks. In the case of pigment inks in which pigments are dispersed in aqueous mediums by using polymers as dispersing agents, the specific gravities, viscosities and surface tensions of the inks can be controlled by properly determining the types and contents of polymers.

—Inks—

Components constituting the inks are described below.

Aqueous Medium

In the inks constituting an ink set, it is preferable to use an aqueous medium containing water and a water-soluble organic solvent. The content (% by mass) of the water-soluble organic solvent in each ink may preferably be 3.0% by mass or more and 50.0% by mass or less based on the total mass of the ink. The content (% by mass) of water in each ink may preferably be 50.0% by mass or more and 95.0% by mass or less based on the total mass of the ink.

As the water-soluble organic solvent, the following may be used. Specifically, it is preferable to use the following: alkyl alcohols having 1 to 6 carbon atoms such as methanol, ethanol, propanol, propanediol, butanol, butanediol, pentanol, pentanediol, hexanol and hexanediol; amides such as dimethylformamide and diethylacetamide; ketones or ketoalcohols such as acetone and diacetone alcohol; ethers such as tetrahydrofuran and dioxane; polyalkylene glycols such as polyethylene glycol and polypropylene glycol, having an average molecular weight of 200, 300, 400, 600 or 1,000; alkylene glycols whose alkylene groups have 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ether acetates such as polyethylene glycol monomethyl ether acetate; glycerol; lower alkyl ethers of polyhydric alcohols, such as ethylene glycol monomethyl(or ethyl) ether, diethylene glycol methyl (or ethyl)ether and triethylene glycol monomethyl(or ethyl) ether; and N-methyl-2-pyrrolidone, 2-pyrrolidone, and 1,3-dimethyl-2-imidazolidinone. Of these, it is particularly preferable to use 1,5-pentanediol, polyethylene glycol having an average molecular weight of 1,000, diethylene glycol, glycerol or 2-pyrrolidone. As the water, deionized water (ion-exchange water) is preferably used.

Coloring Materials

As coloring materials, any materials used in conventional inks may be used. Specifically, pigments and dyes having an anionic group may be used. As the pigments, the following may be used: pigments of a polymer dispersion type (polymer dispersion type pigments) in which a dispersing agent is used to disperse a pigment, and pigments of a self-dispersion type (self-dispersion type pigments) in which hydrophilic groups have been introduced into the pigment particle surface portions. Also, the following may be used: pigments in which organic groups containing a high polymer are chemically bonded to the pigment particle surfaces (polymer-bonded self-dispersion type pigments), and microcapsule type pigments in which the dispersibility of the pigment itself is improved so as to be made dispersible without use of any dispersing agent.

Dye

As the dye, acid dyes, direct dyes and reactive dyes may be used which are listed in COLOR INDEX. Dyes not listed in COLOR INDEX may also be used. In the present invention, it is particularly preferable to use dyes having an anionic group, e.g., a carboxyl group or a sulfonic group. The content (% by mass) of the dye in the ink may preferably be 1.0% by mass or more and 10.0% by mass or less, and more preferably 1.0% by mass or more and 5.0% by mass or less, based on the total mass of the ink.

When dyes are shown by Color Index (C.I.) Number, the following may be used, for example: C.I. Direct Yellow 8, 11, 12, 27, 28, 33, 39, 44, 50, 58, 85, 86, 87, 88, 98, 100, 110; C.I. Direct Red 2, 4, 9, 11, 20, 23, 24, 31, 39, 46, 62, 75, 79, 80, 83, 89, 95, 197, 201, 218, 220, 224, 225, 226, 227, 228, 230; C.I. Direct Blue 1, 15, 22, 25, 41, 76, 77, 80, 86, 90, 98, 106, 108, 120, 158, 163, 168, 199, 226; C.I. Acid Yellow 1, 3, 7, 11, 17, 23, 25, 29, 36, 38, 40, 42, 44, 76, 98, 99; C.I. Acid Red 6, 8, 9, 13, 14, 18, 26, 27, 32, 35, 42, 51, 52, 80, 83, 87, 89, 92, 94, 106, 114, 115, 133, 134, 145, 158, 198, 249, 265, 289; and C.I. Acid Blue 1, 7, 9, 15, 22, 23, 25, 29, 40, 43, 59, 62, 74, 78, 80, 90, 100, 102, 104, 117, 127, 138, 158, 161.

Pigment

As the pigment, carbon black or an organic pigment may preferably be used. The content (% by mass) of the pigment in the ink may preferably be 0.1% by mass or more and 15.0% by mass or less, and more preferably 1.0% by mass or more and 10.0% by mass or less, based on the total mass of the ink.

As a black ink, it is preferable to use carbon black such as furnace black, lamp black, acetylene black or channel black. Specifically, the following commercially available products may be used, for example: RAVEN 7000, RAVEN 5750, RAVEN 5250, RAVEN 5000 ULTRA, RAVEN 3500, RAVEN 2000, RAVEN 1500, RAVEN 1250, RAVEN 1200, RAVEN 1190 ULTRA-II, RAVEN 1170, and RAVEN 1255 (which are available from Columbian Carbon Japan Limited); BLACK PEARLS L, REGAL 330R, REGAL 400R, REGAL 660R, MOGUL L, MONARCH 700, MONARCH 800, MONARCH 880, MONARCH 900, MONARCH 1000, MONARCH 1100, MONARCH 1300, MONARCH 1400, MONARCH 2000, and VALCAN XC-72 (the foregoing are available from Cabot Corp.); COLOR BLACK FW1, COLOR BLACK FW2, COLOR BLACK FW2V, COLOR BLACK FW18, COLOR BLACK FW200, COLOR BLACK S150, COLOR BLACK S160, COLOR BLACK S170, PRINTEX 35, PRINTEX U, PRINTEX 140U, PRINTEX 140V, SPECIAL BLACK 6, SPECIAL BLACK 5, SPECIAL BLACK 4A, and SPECIAL BLACK 4 (the foregoing are available from Degussa Corp.); and No. 25, No. 33, No. 40, No. 47, No. 52, No. 900, No. 2300, MCF-88, MA600, MA7, MA8, and MA100 (the foregoing are available from Mitsubishi Chemicals, Inc.). Also, carbon black prepared newly for the present invention may be used. Of course, in the present invention, examples are by no means limited to these, and any conventionally known carbon black may be used. Not only carbon black, but also fine magnetic-material particles of magnetite, ferrite or the like, and titanium black may also be used.

As the organic pigment, the following may be used, for example: water-insoluble azo pigments such as Toluidine Red, Toluidine maroon, Hanza Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet. Of course, in the present invention, examples are by no means limited to these.

When organic pigments are shown by Color Index (C.I.) Number, the following may be used, for example: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, 185; C.I. Pigment Orange 16, 36, 43, 51, 55, 59, 61, 71; C.I. Pigment Red 9, 48, 49, 52, 53, 57, 97, 122, 123, 149, 168, 175, 176, 177, 180, 192, 215, 216, 217, 220, 223, 224, 226, 228, 238, 240, 254, 255, 272; C.I. Pigment Violet 19, 23, 29, 30, 37, 40, 50; C.I. Pigment Blue 15, 15:1, 15:3, 15:4, 15:6, 22, 60, 64; C.I. Pigment Green 36; and C.I. Pigment Brown 23, 25, 26. Of course, in the present invention, examples are by no means limited to these.

Dispersing Agent

As dispersing agents for dispersing the above pigments in the aqueous medium, any water-soluble polymers may be used. Of these, it is particularly preferable to use a dispersing agent having a weight average molecular weight of 1,000 or more and 30,000 or less, and more preferably 3,000 or more and 15,000 or less. The content (% by mass) of the dispersing agent in the ink may preferably be 0.1% by mass or more and 5.0% by mass or less based on the total mass of the ink.

As the dispersing agent, the following may be used, for example: Polymers formed from monomers such as styrene, vinyl naphthalene, aliphatic alcohol esters of α,β-ethylenically unsaturated carboxylic acids, acrylic acid, maleic acid, itaconic acid, fumaric acid, vinyl acetate, vinyl pyrrolidone, acrylamide, and derivatives thereof. At least one of monomers constituting the polymer may preferably be a hydrophilic monomer. Block copolymers, random copolymers, graft copolymers, or salts thereof may be used. Natural polymers such as rosin, shellac and starch may also be used. It is preferable that these polymers are soluble in an aqueous solution in which a base has been dissolved, i.e., are of an alkali-soluble type.

Other Components

Besides the components described above, the inks constituting an ink set may each contain a moisture-retentive solid component such as urea, a urea derivative, trimethylolpropane or trimethylolethane in order to maintain moisture retention. The content (% by mass) of the moisture-retentive solid component in the ink may be preferably 0.1% by mass or more and 20.0% by mass or less, and more preferably 3.0% by mass or more and 10.0% by mass or less, based on the total mass of the ink.

Further, each of the inks constituting an ink set may use a surfactant such as an anionic surfactant, a nonionic surfactant or an amphoteric surfactant. Specifically, the following may be used: polyoxyethylene alkyl ethers, polyoxyethylene alkyl phenols, acetylene glycol compounds, and acetylene glycol ethylene oxide adducts.

Besides the components described above, each of the inks constituting an ink set may optionally contain various additives such as a pH adjuster, an antirust, an antiseptic agent, a mildew-proofing agent, an antioxidant, a reduction-preventive agent and an evaporation accelerator.

—Ink Set—

The ink set may have any form cited below, as long as it uses a plurality of inks in combination. For example, an ink set may be cited which is constituted of ink cartridges, or ink cartridges with a recording head, having a structure in which ink storage portions each of which stores each of a cyan ink, a magenta ink, a yellow ink and a black ink are integrally provided. An ink set may also be cited which is constituted of ink cartridges, or ink cartridges with a recording head, having a structure in which ink storage portions each of which stores each of a cyan ink, a magenta ink and a yellow ink are integrally provided. An ink set may further be cited in which each of ink cartridges storing each of such inks as above is detachably attached to an ink jet recording apparatus. In any case, the present invention specifies the properties of an ink itself relative to other inks used in combination in an ink jet recording apparatus or as ink cartridges, and may have any modified form without being limited to the forms cited above.

In the present invention, among the plurality of inks constituting the ink set, an ink having the largest specific gravity is referred to as the first ink; an ink having the smallest specific gravity, as the second ink; and an ink(s) other than the first ink and second ink, i.e., an ink(s) having an intermediate specific gravity as the third ink. That is, where the inks constituting the ink set are of three types, each of the three types of inks corresponds to each of the first ink, the second ink and the third ink. Where the inks constituting the ink set are of four types, two types of inks correspond to the third ink. In this case as well, the ejection orifice lines are required to be arranged so that the total sum of the differences in specific gravities between the inks to be ejected from ejection orifice lines adjacent to each other among four or more types of inks to be ejected from the ejection orifice lines becomes minimal.

—Ink jet Recording Method—

The plurality of inks constituting the ink set is particularly preferably used in an ink jet recording method in which the inks are ejected by ink jet method. The ink-jet recording method includes, e.g., a recording method in which mechanical energy is allowed to act on an ink to eject the ink, and a recording method in which thermal energy is allowed to act on an ink to eject the ink. In particular, the ink jet recording method using thermal energy is preferably used in the present invention.

—Ink Cartridge—

Ink cartridges suitable for recording performed using the plurality of inks constituting the ink set include ink cartridges having ink storage portions for storing these inks. Each ink cartridge is set up as described below.

Figure 8:
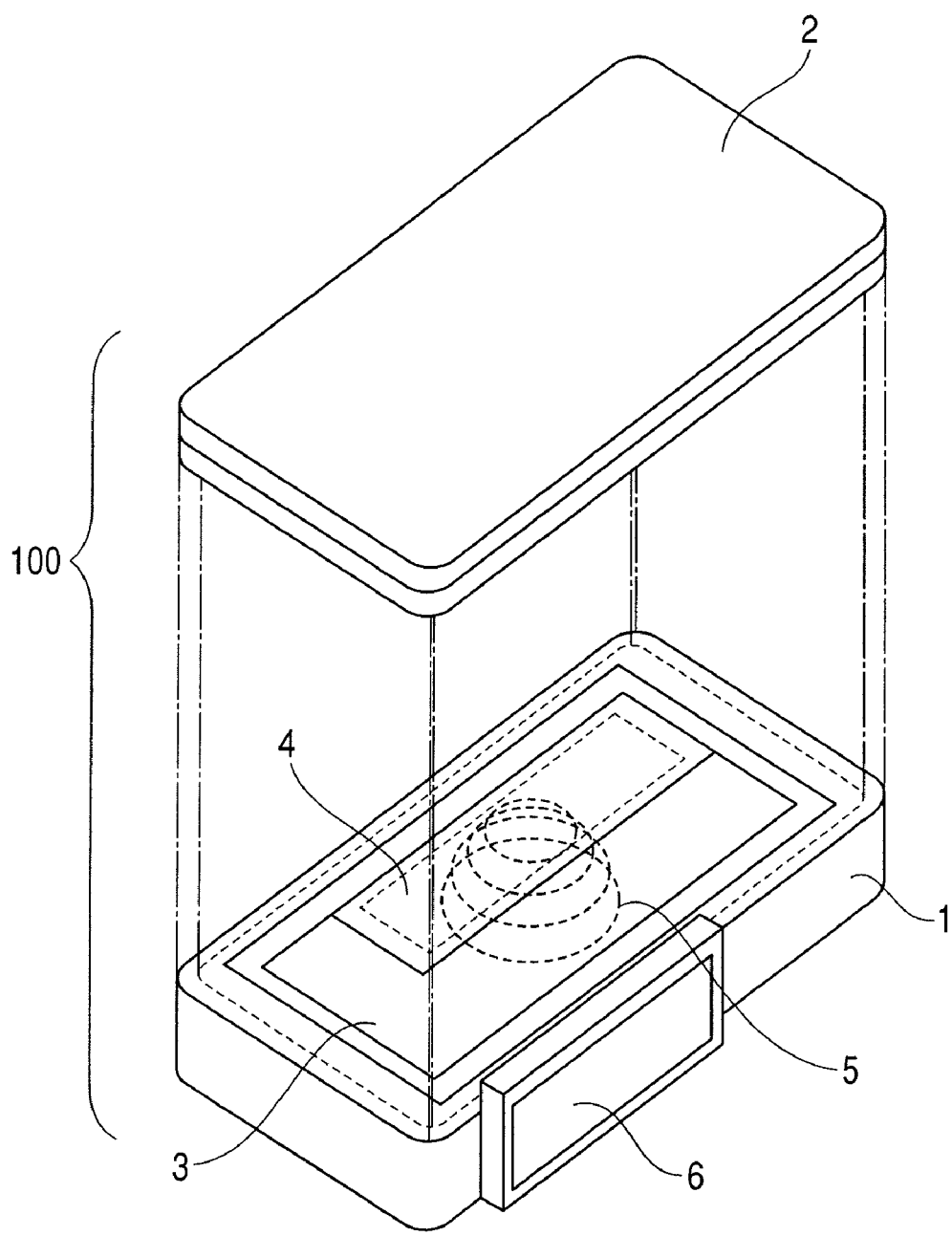
FIG. 8 is an exploded perspective view of an ink cartridge.

FIG. 8 is an exploded perspective view of an ink cartridge. In FIG. 8, an ink cartridge 100 has a casing member constituted of a housing 1 and a cover member 2, and an upward protrudent sheet 3 bonded to the housing 1 and provided with folded parts. These form an ink storage portion. The ink storage portion is provided therein with a pressure plate 4 and a compressed coil spring 5 which put the pressure plate 4 toward the upward protrudent sheet side. Thus, the upward protrudent sheet 3 is pressed outward to produce negative pressure in the ink storage portion. The housing 1 is provided on one side thereof with an ink supply opening 6 coming in contact with ink channels extending to a recording head (not shown). The housing 1 constitutes a container storing therein the ink as described above. The upward protrudent sheet 3 is welded to the outer periphery of the housing 1. The cover member 2 is attached to the open top of the housing 1 to protect the upward protrudent sheet 3 which protrudes outward.

—Recording Unit—

A recording unit suitable for recording performed by using the plurality of inks constituting the ink set includes a recording unit having (i) the ink cartridges having ink storage portions for storing therein these inks and (ii) a recording head. In the present invention, it is particularly preferable to use a recording unit in which the inks are ejected from the recording head by the action of heat energy.

—Ink jet Recording Apparatus—

An ink jet recording apparatus suitable for recording performed using the plurality of inks constituting the ink set includes an ink jet recording apparatus having (i) the ink cartridges having ink storage portions for storing therein these inks and (ii) a recording head for ejecting the inks. In the present invention, it is particularly preferable to use an ink jet recording apparatus in which the inks are ejected from the recording head by the action of heat energy.

The schematic construction of the structural mechanical part of an ink jet recording apparatus is described below. The ink jet recording apparatus is composed, according to the function of each mechanism, of a sheet feed part, a sheet transport part, a carriage part, a sheet delivery part, a cleaning part, and an exterior housing which protects these and provides design quality. These are schematically described below.

Figure 2:
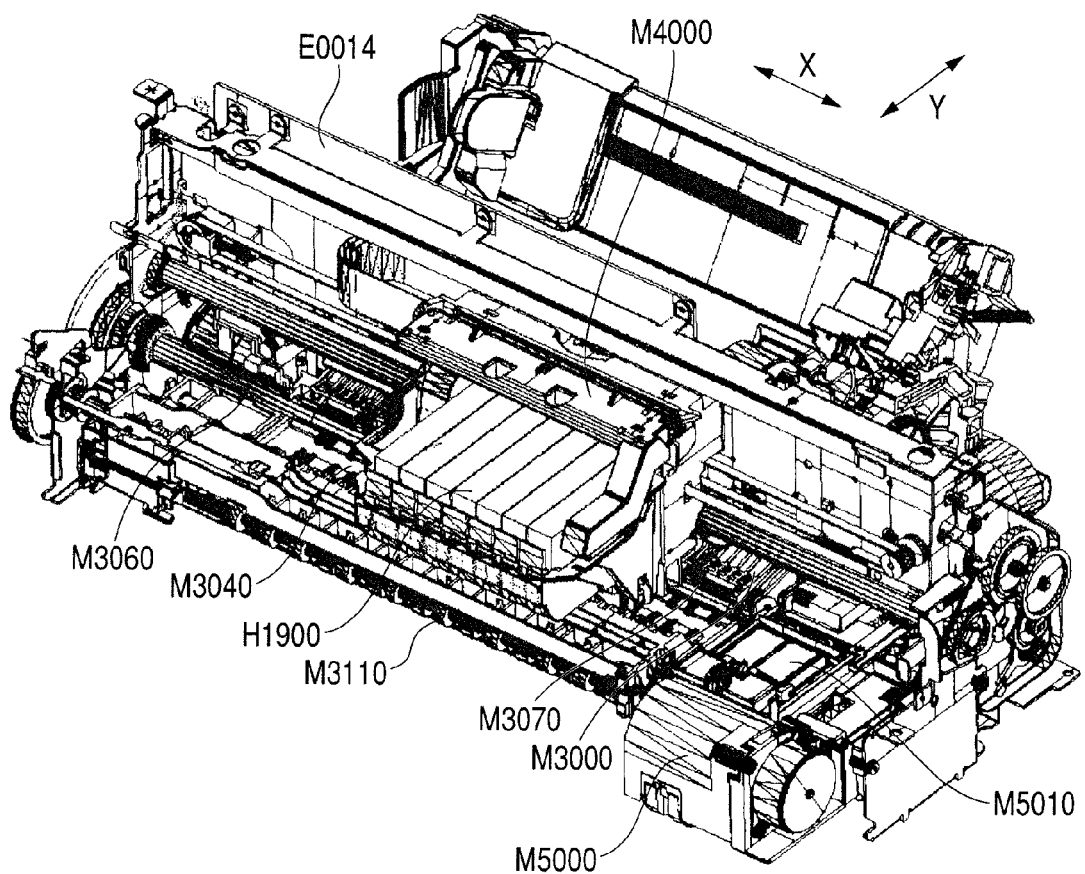
FIG. 2 is a perspective view of the structural mechanical part of the ink jet recording apparatus.
Figure 3:
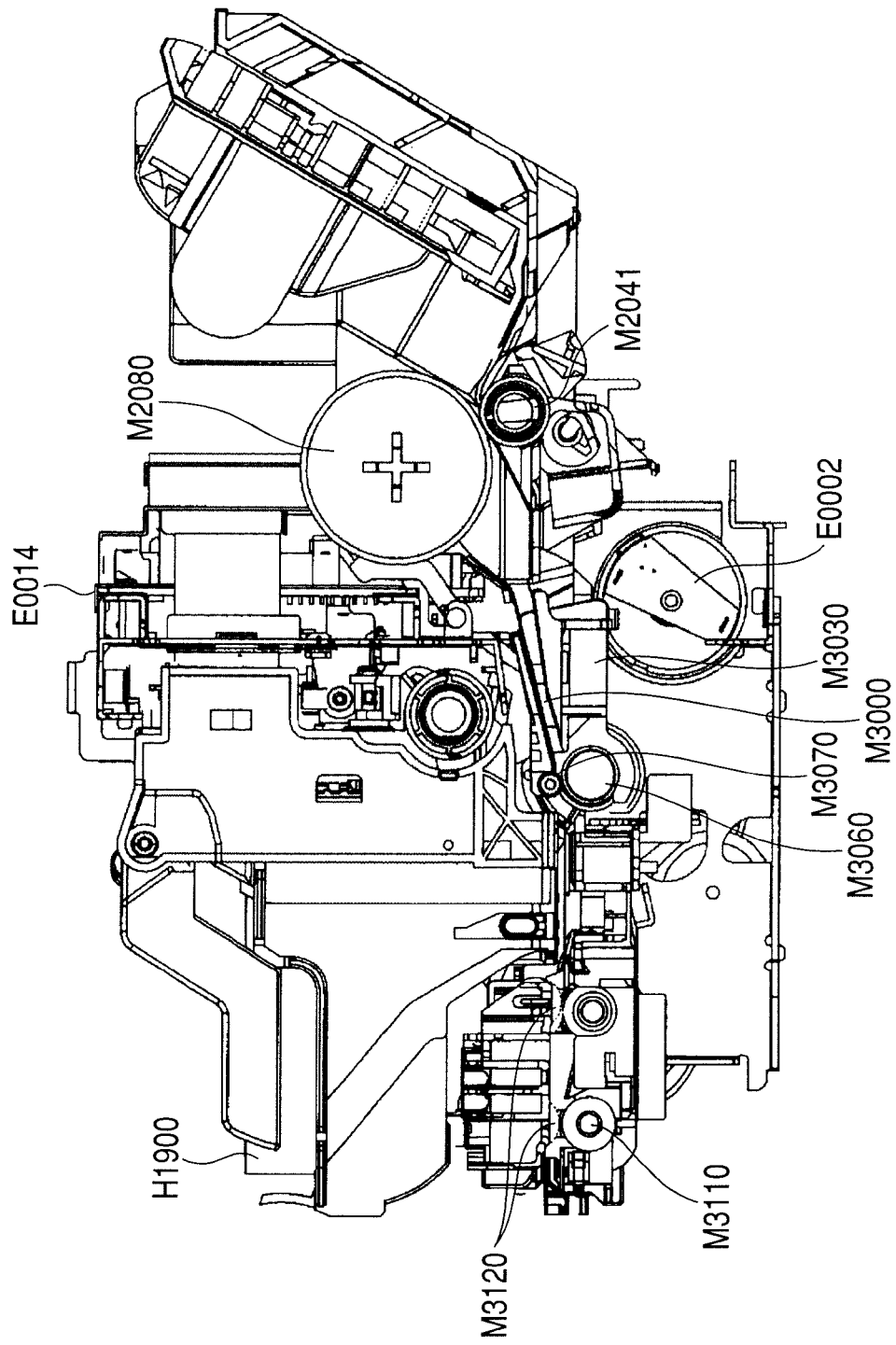
FIG. 3 is a sectional view of the ink jet recording apparatus.

FIG. 1 is a perspective view of the ink jet recording apparatus. FIGS. 2 and 3 are views to illustrate the internal structure of the ink jet recording apparatus. FIGS. 2 and 3 are a perspective view as viewed form the upper right and a sectional side view of the ink jet recording apparatus, respectively.

When recording sheets are fed in the recording apparatus, first, in the sheet feed part having a sheet feed tray M2060, the predetermined number of sheets of recording mediums are sent to a nip zone formed from a sheet feed roller M2080 and a separation roller M2041 (see FIGS. 1 and 3). The recording mediums thus sent are separated at the nip zone, and only the uppermost recording medium is transported. The recording medium sent to the sheet transport part is guided by a pinch roller holder M3000 and a sheet guide flapper M3030, and is sent to a pair of rollers, a transport roller M3060 and a pinch roller M3070. The pair of rollers consisting of the transport roller M3060 and the pinch roller M3070 is rotated by an LF motor E0002, and the recording medium is transported over a platen M3040 by this rotation (for the above, see FIGS. 2 and 3).

In the carriage part, when images are formed on the recording medium, a recording head H1001 (see FIG. 4) is set at the intended image forming position, and ejects inks against the recording medium in accordance with signals sent form an electric circuit board E0014 (see FIG. 2). The detailed construction of the recording head H1001 will be described later. Recording is performed by the recording head H1001, during which it repeats alternately the primary scanning in which scanning is carried out with a carriage M4000 (see FIG. 2) in the column direction and the secondary scanning in which the transport roller M3060 (see FIGS. 2 and 3) transports the recording medium in the line direction, whereby images are formed on the recording medium.

Finally, the recording medium is inserted into a nip between a first sheet delivery roller M3110 and a spur M3120 at the sheet delivery part (see FIG. 3), is transported therethrough, and is delivered to a sheet delivery tray M3160 (see FIG. 1).

Figure 7:
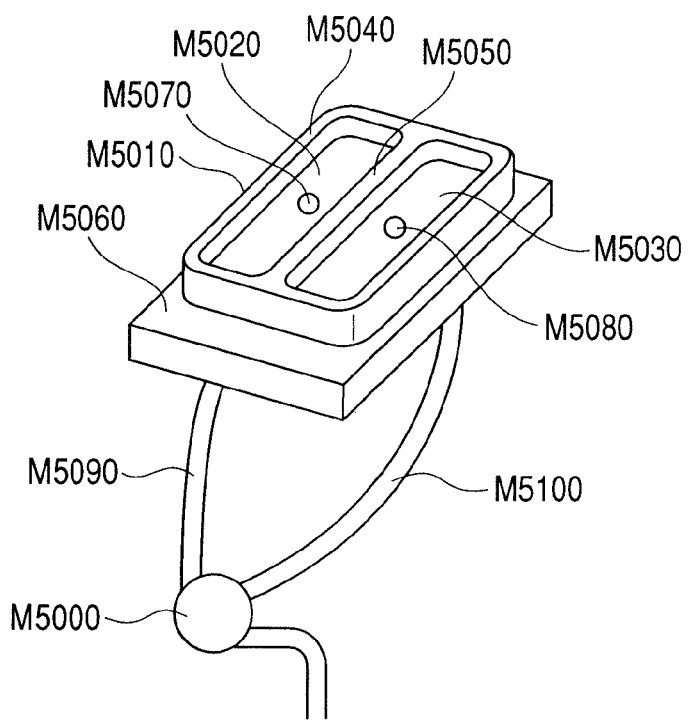
FIG. 7 is a diagrammatic view showing the construction of a cleaning part of the ink jet recording apparatus.

FIG. 7 is a diagrammatic view showing the construction of the cleaning part of the ink jet recording apparatus. At the cleaning part, a pump M5000 is operated in the state a cap M5010 is brought into contact with a face having ink ejection orifices (an ejection orifice face) of the recording head H1001, whereupon inks are purged from the recording head H1001 to conduct cleaning operation for the recording head H1001 (see FIG. 4). A cap holder M5060 is moved upward by an up and down movable mechanism, and the cap M5010 is brought into contact with the ejection orifice face of the recording head H1001 at appropriate close-contact force to perform capping. The pump M5000 is operated in the state the capping has been performed, whereupon negative pressure is produced between the ejection orifice face and the pump M5000, so that inks are purged from the respective ejection orifices constituting ejection orifice lines. In the present invention, it is preferable that ejection orifice lines which eject at least three types of inks including two types of inks which are different in specific gravity by 0.020 or more among the plurality of inks constituting the ink set, are capped with the same cap. In the state the capping has been thus performed, the ejection orifice lines are hermetically-closed with purging chambers M5020 and M5030.

The purging chambers M5020 and M5030 are provided with ink discharge openings M5070 and M5080, respectively. In the example shown in the drawing, the purging chamber M5020 is provided with the ink discharge opening M5070; and the purging chamber M5030, with the ink discharge opening M5080. Tubes M5090 and M5100 are connected to these ink discharge openings M5070 and M5080, respectively. Further, the tubes M5090 and M5100 are connected to the pump M5000. The cap holder M5060 holds the cap M5010 and is driven in the direction where the cap M5010 is brought into contact with, or separated from, the ejection orifice face of the recording head H1001 by means of a drive mechanism (not shown).

When the inks remaining in the cap M5010 are sucked in the state the cap M5010 is opened, a constitution is employed in which sticking of inks and other difficulties do not occur.

In FIG. 7, construction is shown in which a purging chamber formed of a peripheral wall M5040 is partitioned with a partition wall M5050 into two purging chambers having an equal volume. These purging chambers may be different in volume from each other. Further, the purging chamber may be single. The purging chamber(s) may also be provided therein with an ink absorber.

—Recording Head Construction—

The construction of a head cartridge H1000 will be described (see FIG. 4). The head cartridge H1000 has the recording head H1001, a means for mounting ink cartridges denoted collectively as H1900, and a means for supplying inks from the ink cartridges H1900 to the recording head. The head cartridge H1000 is detachably mounted to the carriage M4000 (see FIG. 2).

Figure 4:
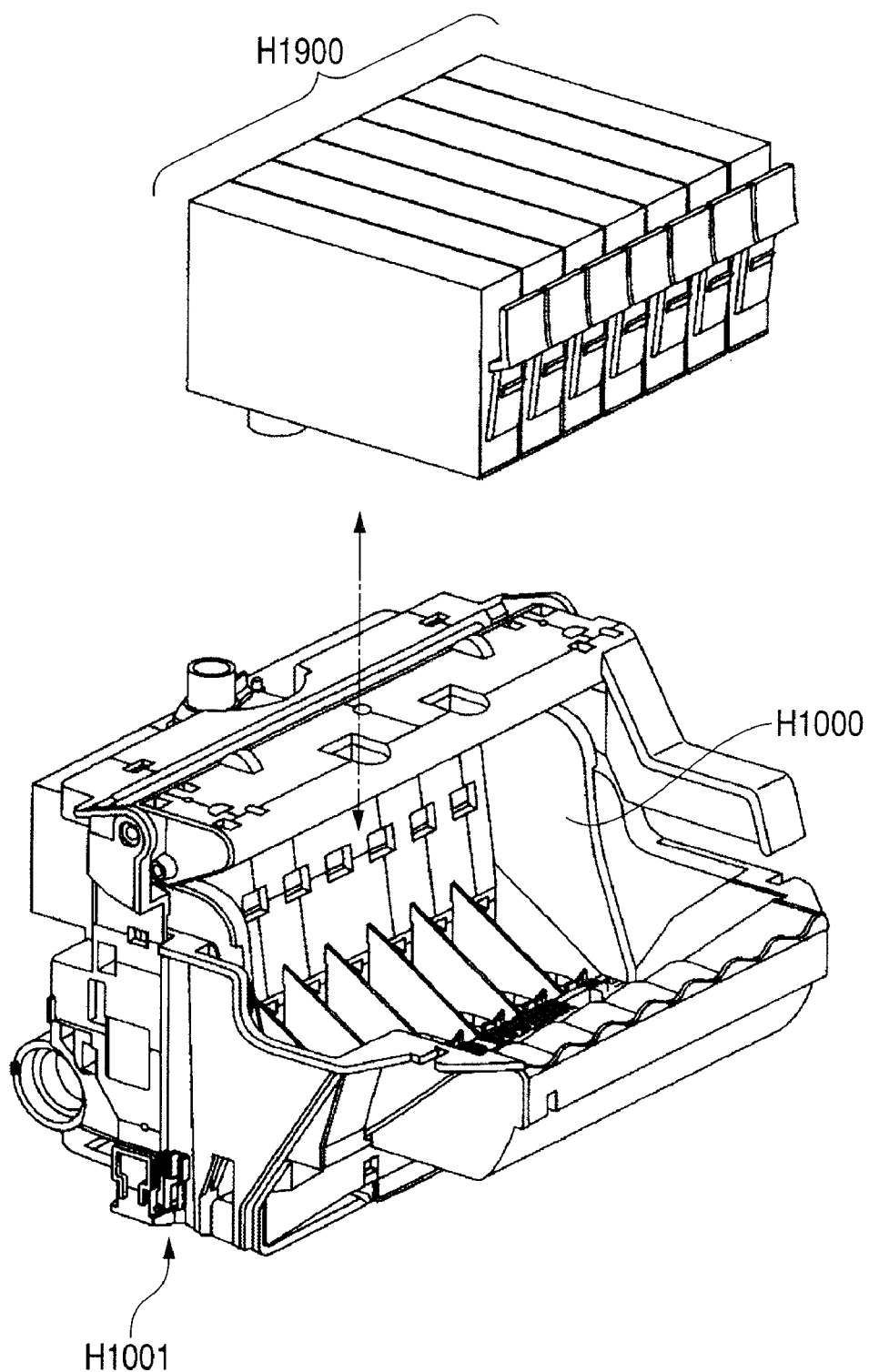
FIG. 4 is a perspective view showing how ink cartridges are attached to a head cartridge.

FIG. 4 illustrates how the ink cartridges H1900 are attached to the head cartridge H1000. The ink jet recording apparatus forms images using, e.g., yellow, magenta, cyan, black, light magenta, light cyan and green inks. Accordingly, the ink cartridges H1900 as well are each independently prepared for seven colors. As shown in FIG. 4, each ink cartridge is detachably set in the head cartridge H1000. Here, the ink cartridges H1900 may be attached or detached in the state the head cartridge H1000 is mounted on the carriage M4000 (see FIG. 2).

Figure 5:
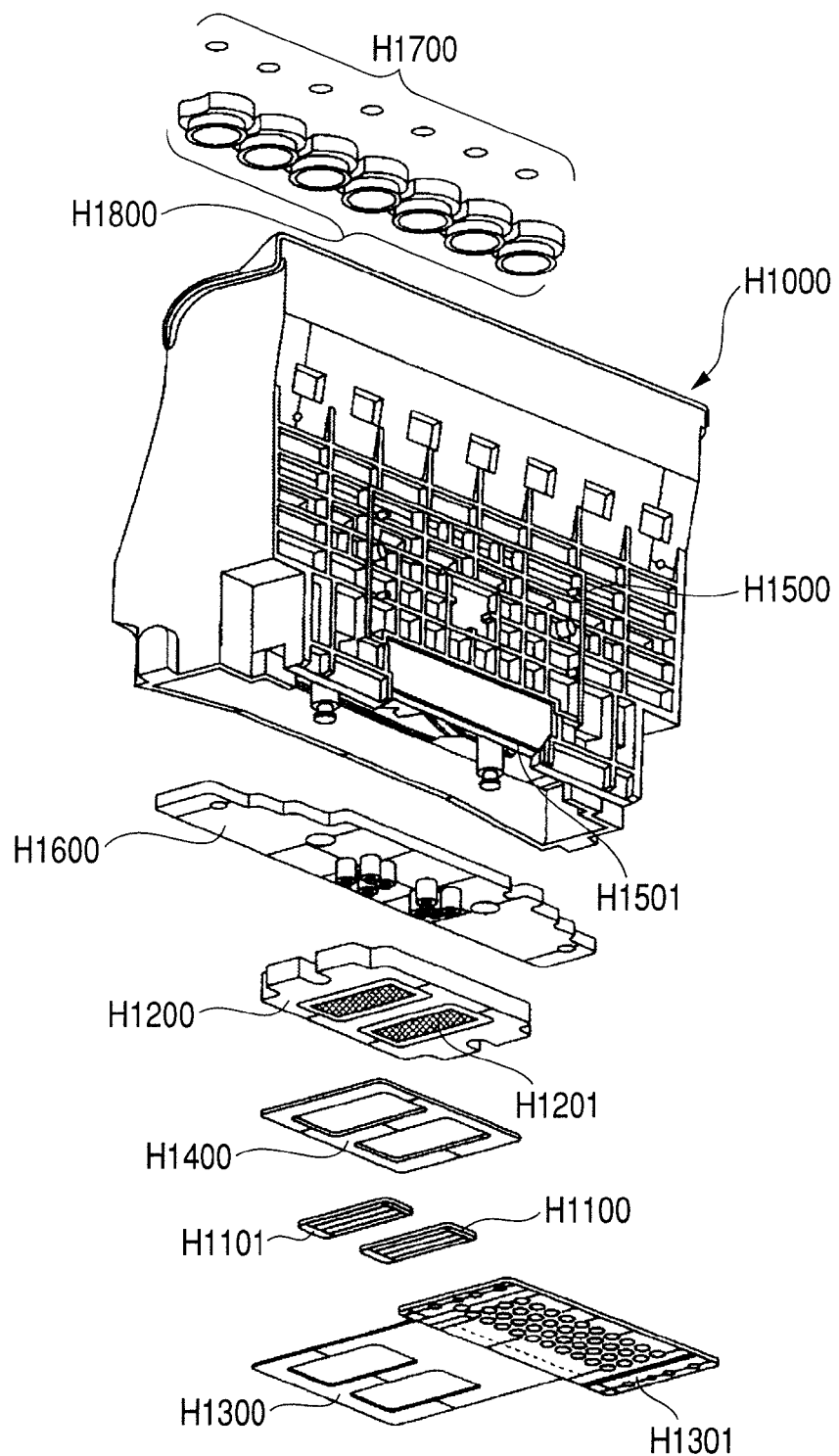
FIG. 5 is an exploded perspective view of the head cartridge.

FIG. 5 is an exploded perspective view of the head cartridge H1000. The head cartridge H1000 is constituted of a recording element board, a plate, an electric wiring circuit board H1300, an ink cartridge holder H1500, an ink channel forming member H1600, filters H1700, seal rubbers H1800, etc. The recording element board is constituted of a first recording element board H1100 and a second recording element board H1101. The plate is constituted of a first plate H1200 and a second plate H1400.

The first recording element board H1100 and the second recording element board 1101 are each a silicon board, on one side of which a plurality of recording elements (nozzles) for ejecting inks are formed by photolithography. Al electric wiring through which electric power is supplied to each recording element is formed by a film-forming technique. A plurality of ink channels corresponding to the individual recording elements are also formed by photolithography. Further, ink supply openings for supplying inks to the ink channels are so formed as to be open on the back.

Figure 6:
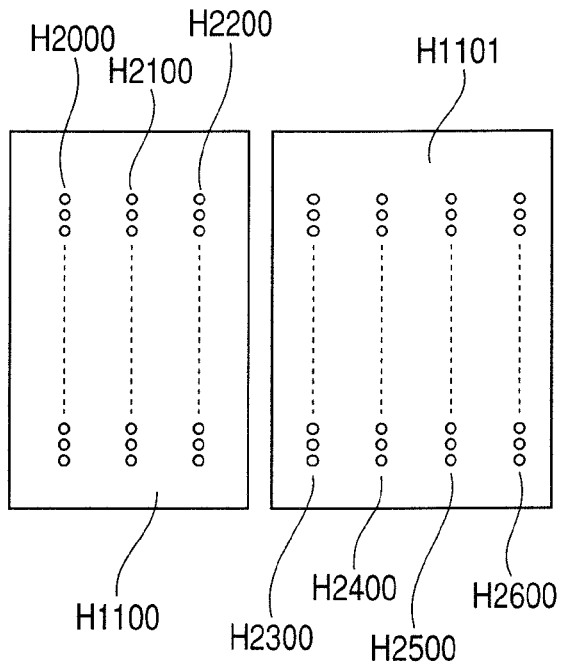
FIG. 6 is a front view showing a recording element board in the head cartridge.

FIG. 6 is an enlarged front view to illustrate the construction of the first recording element board H1100 and second recording element board H1101. Reference characters H2000 to H2600 denote lines of recording elements (hereinafter referred to also as "ejection orifice line(s)") which supply different inks, respectively. In the first recording element board H1100, ejection orifice lines for three colors are formed which are a yellow ink ejection orifice line H2000, a magenta ink ejection orifice line H2100 and a cyan ink ejection orifice line H2200. In the second recording element board H1101, ejection orifice lines for four colors are formed which are a light-cyan ink ejection orifice line H2300, a black ink ejection orifice line H2400, a green ink ejection orifice line H2500 and a light-magenta ink ejection orifice line H2600. Each ejection orifice line is constituted of a plurality of nozzles arranged at predetermined intervals in the transport direction of the recording medium. Openings of the nozzles, i.e., the ejection orifices, are formed in the direction of gravity. FIG. 6 shows an illustration in which part of the nozzles constituting the ejection orifice lines are omitted.

The head cartridge H1000 is described below with reference to FIGS. 5 and 6. The first recording element board H1100 and the second recording element board H1101 are attached and fixed to the first plate H1200 by bonding. In this plate, an ink supply opening H1201 is formed through which the ink is to be fed to the first recording element board H1100 and second recording element board H1101. Further, the second plate H1400 having openings is attached and fixed to the first plate H1200. This second plate H1400 holds the electric wiring circuit board H1300 so that the electric wiring circuit board H1300 is electrically connected with the first recording element board H1100 and second recording element board H1101.

Electric signals are applied to the electric wiring circuit board H1300 for ejecting the inks from the respective nozzles formed in the first recording element board H1100 and second recording element board H1101. This electric wiring circuit board H1300 has electric wiring corresponding to the first recording element board H1100 and second recording element board H1101, and an external signal input terminal H1301 which is positioned at an end portion of this electric wiring and receives the electric signals from the ink jet recording apparatus. The external signal input terminal H1301 is located and fastened on the back side of the ink cartridge holder H1500.

To the ink cartridge holder H1500 which holds the ink cartridges H1900, the channel forming member H1600 is fastened by, e.g., ultrasonic welding to form ink channels H1501 which connects the ink cartridges H1900 with the first plate H1200. At ink cartridge side end portions of the ink channels H1501 engaging with the ink cartridges H1900, the filters H1700 are provided so that any dust and dirt can be prevented from entering from the outside. The seal rubbers H1800 are also fitted at the part where the ink channels H1501 engage with the ink cartridges H1900 so that the inks can be prevented from evaporating through the engagement part.

Further, the ink cartridge holder part is joined to the recording head H1001 by bonding to set up the head cartridge H1000 as mentioned above. The ink cartridge holder part is constituted of the ink cartridge holder H1500, the channel forming member H1600, the filters H1700 and the seal rubbers H1800. The recording head H1001 is constituted of the first recording element board H1100, the second recording element board H1101, the first plate H1200, the electric wiring circuit board H1300 and the second plate H1400.

FIG. 9 is a diagrammatic view showing an example of the construction of the recording head. The recording head has a plurality of ejection orifice lines which eject inks. When images are formed, scanning is carried out with the recording head in the forward direction of the primary scanning direction shown in FIG. 9 to thereby form images on the recording medium by one-pass recording. Next, during the course of scanning in the backward direction of the recording head, the recording medium is transported only by a predetermined distance in the secondary scanning direction. This operation is repeated to form images.

Figure 10:
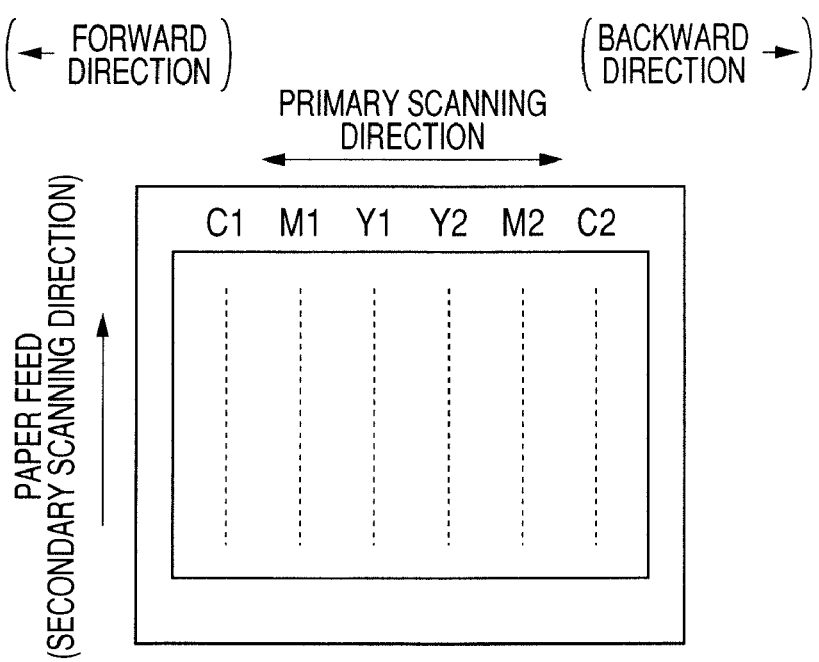
FIG. 10 is a diagrammatic view showing an example of the construction of a recording head.

FIG. 10 is a diagrammatic view showing another example of the construction of the recording head. The recording head has ejection orifice lines which eject color inks and are arranged so that the order of applying the color inks can be equal between the forward direction and backward directions in the primary scanning direction. Specifically, color ink ejection orifice lines are formed in two lines for each color ink to be symmetrical in the primary scanning direction (cyan ink (C1, C2), magenta ink (M1, M2) and yellow ink (Y1, Y2)). This enables bi-directional recording.

EXAMPLES

The present invention is described below in greater detail by giving Examples and Comparative Examples. The present invention is by no means limited by the following Examples unless it is beyond its gist. In the following description, "part(s)" and "%." are by mass unless otherwise indicated.

Preparation of Pigment Dispersions 1 to 4

Pigment Dispersions 1 to 4 were prepared by the procedure shown below.

Preparation of Pigment Dispersion 1 containing C.I. Pigment Red 122:

8 parts of a pigment (C.I. Pigment Red 122), 2.8 parts of a dispersing agent and 89.2 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 µm in pore size (available from Fuji Photo Film Co., Ltd.) to prepare Pigment Dispersion 1 having a pigment concentration of 8% by mass. As the dispersing agent, a polymer was used which was obtained by neutralizing poly(benzyl methacrylate-co-acrylic acid) (compositional molar ratio: 70:30) having an acid value of 200 and a weight average molecular weight of 12,000 with a 10% by mass potassium hydroxide aqueous solution.

Preparation of Pigment Dispersion 2 containing C.I. Pigment Yellow 74:

8 parts of a pigment (C.I. Pigment Yellow 74), 7 parts of a dispersing agent and 85 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 µm in pore size (available from Fuji Photo Film Co., Ltd.) to prepare Pigment Dispersion 2 having a pigment concentration of 8% by mass. As the dispersing agent, a polymer was used which was obtained by neutralizing a styrene-acrylic acid copolymer having an acid value of 200 and a weight average molecular weight of 10,000 with an aqueous 8% by mass sodium hydroxide solution.

Preparation of Pigment Dispersion 3 containing C.I. Pigment Blue 15:3:

8 parts of a pigment (C.I. Pigment Blue 15:3), 8 parts of a dispersing agent and 84 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 µm in pore size (available from Fuji Photo Film Co., Ltd.) to prepare Pigment Dispersion 3 having a pigment concentration of 8% by mass. As the dispersing agent, a polymer was used which was obtained by neutralizing poly(benzyl methacrylate-co-acrylic acid) (compositional molar ratio: 70:30) having an acid value of 200 and a weight average molecular weight of 12,000 with an aqueous 10% by mass sodium hydroxide solution.

Preparation of Pigment Dispersion 4 containing C.I. Pigment Green 7:

8 parts of a pigment (C.I. Pigment Green 7), 4.8 parts of a dispersing agent and 87.2 parts of ion-exchange water were mixed, followed by dispersion for 3 hours by means of a batch type vertical sand mill. Thereafter, the fluid dispersion obtained was treated by centrifugation to remove coarse particles, followed by pressure filtration using a micro-filter of 3.0 μm in pore size (available from Fuji Photo Film Co., Ltd.) to prepare Pigment Dispersion 4 having a pigment concentration of 8% by mass. As the dispersing agent, a polymer was used which was obtained by neutralizing a benzyl methacrylate-acrylic acid block copolymer having an acid value of 250 and a weight average molecular weight of 5,000 with an aqueous 10% by mass potassium hydroxide solution.

Preparation of Inks

The components shown in the following Table 1 were mixed, and stirred thoroughly, followed by pressure filtration using a micro-filter of 3.0 μm in pore size (available from Fuji Photo Film Co., Ltd.) to prepare Inks 1 to 11. In Table 1, the values of specific gravity, viscosity and surface tension of each ink are shown. The specific gravity was measured at 25° C. by using a float type specific gravity hydrometer (trade name: Standard Specific Gravity Hydrometer; manufactured by Tech-Jam Co., Ltd.). The viscosity was measured at 25° C. by using RE80L Type Viscometer (manufactured by Toki Sangyo Co., Ltd.). The surface tension was measured at 25° C. by using an automatic surface tension meter CBVP-Z (manufactured by Kyowa Interface Science Co., Ltd.).

TABLE 1

| | Ink | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment Dispersion 1 | | | 50.0 | | 50.0 | 50.0 | 50.0 | | | | |
| Pigment Dispersion 2 | | 50.0 | | | | | | | | 50.0 | |
| Pigment Dispersion 3 | 50.0 | | | 50.0 | | | | 50.0 | 50.0 | | |
| Pigment Dispersion 4 | | | | | | | | | | | 50.0 |
| Glycerol | 8.0 | 7.5 | 4.0 | 8.0 | 3.0 | 2.0 | 10.0 | 4.0 | 8.0 | 7.5 | 10.0 |
| Diethylene glycol | | | | 5.0 | | | | | 5.0 | | 5.0 |
| 2-Pyrrolidone | 2.0 | 2.0 | 2.0 | 2.0 | 2.0 | 2.0 | | 2.0 | 2.0 | 2.0 | 3.0 |
| Polyethylene glycol (*1) | 4.0 | 2.0 | | 4.5 | | 3.0 | | 3.0 | 4.5 | 2.0 | 3.0 |
| 1,5-Pentanediol | 2.0 | 2.0 | 2.0 | 2.0 | 4.0 | 3.0 | 2.0 | 10.0 | 2.0 | 2.0 | 2.0 |
| ACETYRENOL E100 (*2) | 0.3 | 0.3 | 0.3 | 0.3 | 0.3 | 0.3 | 0.3 | 0.3 | 0.5 | 0.4 | 0.3 |
| Ion-exchange water | 33.7 | 36.2 | 41.7 | 28.2 | 40.7 | 39.7 | 37.7 | 30.7 | 28.0 | 36.1 | 26.7 |
| Specific gravity of ink (-) | 1.058 | 1.044 | 1.030 | 1.065 | 1.027 | 1.030 | 1.044 | 1.044 | 1.065 | 1.044 | 1.079 |
| Viscosity of ink (mPa · s) | 3.8 | 3.1 | 2.2 | 4.2 | 2.3 | 3.1 | 2.5 | 3.9 | 4.2 | 3.1 | 4.0 |
| Surface tension of ink (mN/m) | 39.7 | 39.8 | 39.7 | 39.4 | 39.4 | 39.5 | 39.0 | 40.0 | 36.7 | 38.0 | 39.5 |

(*1) weight average molecular weight: 1,000
(*2) Acetylene glycol ethylene oxide adduct (available from Kawaken Fine Chemicals Co., Ltd.)

Production of Ink Set Constituted of Three Types of Inks

The inks obtained as described above were used in such combinations as shown in the upper column of Table 2 shown below, to make up ink sets of Examples 1 to 5, Comparative Examples 1 to 10 and Reference Examples 1 and 2. The inks constituting the respective ink sets were each filled into the ink cartridge constructed as shown in FIG. 8. The ink cartridge constructed as shown in FIG. 8 has the ink storage portion which is brought into a hermetically-closed state, i.e., has the ink storage portion in which the ink comes into contact with the atmosphere only through the ink supply opening. When the inks were filled into the ink cartridges, the inks were filled in the following quantities based on the maximum quantity in which each ink could be filled into the ink cartridge. The first ink was filled in a half quantity based on the maximum fill of the ink cartridge, and the second ink and the third ink were each filled in the maximum fill into the ink cartridge. The fill of each of the inks constituting the ink set was set as above so that the differences of the ripples in the recording head were more easily brought about. At the lower column of Table 2, various values of the inks constituting the ink set are shown together.

TABLE 2

| | Example | | | | | Comparative Example | | | |
|---|---|---|---|---|---|---|---|---|---|
| | 1 | 2 | 3 | 4 | 5 | 1 | 2 | 3 | 4 |
| First ink (ink with largest specific gravity) | 1 | 4 | 1 | 1 | 9 | 1 | 1 | 4 | 4 |
| Second ink (ink with smallest specific gravity) | 3 | 3 | 5 | 6 | 3 | 3 | 3 | 3 | 3 |
| Third ink (ink with intermediate specific gravity) | 2 | 2 | 2 | 2 | 10 | 2 | 2 | 2 | 2 |

TABLE 2-continued

| | | | | | | | | | |
|---|---|---|---|---|---|---|---|---|---|
| Specific gravity of first ink (-) | | 1.058 | 1.065 | 1.058 | 1.058 | 1.065 | 1.058 | 1.058 | 1.065 | 1.065 |
| Specific gravity of second ink (-) | | 1.030 | 1.030 | 1.027 | 1.030 | 1.030 | 1.030 | 1.030 | 1.030 | 1.030 |
| Specific gravity of third ink (-) | | 1.044 | 1.044 | 1.044 | 1.044 | 1.044 | 1.044 | 1.044 | 1.044 | 1.044 |
| Inks set at respective positions | Y | First | First | First | First | First | First | Third | First | Third |
| | M | Third | Third | Third | Third | Third | Second | First | Second | First |
| | C | Second | Second | Second | Second | Second | Third | Second | Third | Second |
| Specific gravity of inks set at respective positions (-) | Y | 1.058 | 1.065 | 1.058 | 1.058 | 1.065 | 1.058 | 1.044 | 1.065 | 1.044 |
| | M | 1.044 | 1.044 | 1.044 | 1.044 | 1.044 | 1.030 | 1.058 | 1.030 | 1.065 |
| | C | 1.030 | 1.030 | 1.027 | 1.030 | 1.030 | 1.044 | 1.030 | 1.044 | 1.030 |
| Difference in specific gravity between inks set at positions Y and M (-) | | 0.014 | 0.021 | 0.014 | 0.014 | 0.021 | 0.028 | 0.014 | 0.035 | 0.021 |
| Difference in specific gravity between inks set at positions M and C (-) | | 0.014 | 0.014 | 0.017 | 0.014 | 0.014 | 0.014 | 0.028 | 0.014 | 0.035 |
| Total sum of differences in specific gravity (-) | | 0.028 | 0.035 | 0.031 | 0.028 | 0.035 | 0.042 | 0.042 | 0.049 | 0.056 |
| Viscosity of inks set at respective positions (mPa·s) | Y | 3.8 | 4.2 | 3.8 | 3.8 | 4.2 | 3.8 | 3.1 | 4.2 | 3.1 |
| | M | 3.1 | 3.1 | 3.1 | 3.1 | 3.1 | 2.2 | 3.8 | 2.2 | 4.2 |
| | C | 2.2 | 2.2 | 2.3 | 3.1 | 2.2 | 3.1 | 2.2 | 3.1 | 2.2 |
| Surface tension of inks set at respective positions (mN/m) | Y | 39.7 | 39.4 | 39.7 | 39.7 | 36.7 | 39.7 | 39.8 | 39.4 | 39.8 |
| | M | 39.8 | 39.8 | 39.8 | 39.8 | 38.0 | 39.7 | 39.7 | 39.7 | 39.4 |
| | C | 39.7 | 39.7 | 39.4 | 39.5 | 39.7 | 39.8 | 39.7 | 39.8 | 39.7 |

| | | Comparative Example | | | | | | Reference Example | |
|---|---|---|---|---|---|---|---|---|---|
| | | 5 | 6 | 7 | 8 | 9 | 10 | 1 | 2 |
| First ink (ink with largest specific gravity) | | 1 | 1 | 1 | 1 | 9 | 9 | 1 | 8 |
| Second ink (ink with smallest specific gravity) | | 5 | 5 | 6 | 6 | 3 | 3 | 7 | 3 |
| Third ink (ink with intermediate specific gravity) | | 2 | 2 | 2 | 2 | 10 | 10 | 2 | 2 |
| Specific gravity of first ink (-) | | 1.058 | 1.058 | 1.058 | 1.058 | 1.065 | 1.065 | 1.058 | 1.044 |
| Specific gravity of second ink (-) | | 1.027 | 1.027 | 1.030 | 1.030 | 1.030 | 1.030 | 1.044 | 1.030 |
| Specific gravity of third ink (-) | | 1.044 | 1.044 | 1.044 | 1.044 | 1.044 | 1.044 | 1.044 | 1.044 |
| Inks set at respective positions | Y | First | Third | First | Third | First | Third | First | First |
| | M | Second | First | Second | First | Second | First | Third | Third |
| | C | Third | Second | Third | Second | Third | Second | Second | Second |
| Specific gravity of inks set at respective positions (-) | Y | 1.058 | 1.044 | 1.058 | 1.044 | 1.065 | 1.044 | 1.058 | 1.044 |
| | M | 1.027 | 1.058 | 1.030 | 1.058 | 1.030 | 1.065 | 1.044 | 1.044 |
| | C | 1.044 | 1.027 | 1.044 | 1.030 | 1.044 | 1.030 | 1.044 | 1.030 |
| Difference in specific gravity between inks set at positions Y and M (-) | | 0.031 | 0.014 | 0.028 | 0.014 | 0.035 | 0.021 | 0.014 | 0.000 |
| Difference in specific gravity between inks set at positions M and C (-) | | 0.017 | 0.031 | 0.014 | 0.028 | 0.014 | 0.035 | 0.000 | 0.014 |
| Total sum of differences in specific gravity (-) | | 0.048 | 0.045 | 0.042 | 0.042 | 0.049 | 0.056 | 0.014 | 0.014 |
| Viscosity of inks set at respective positions (mPa·s) | Y | 3.8 | 3.1 | 3.8 | 3.1 | 4.2 | 3.1 | 3.8 | 3.9 |
| | M | 2.3 | 3.8 | 3.1 | 3.8 | 2.2 | 4.2 | 3.1 | 3.1 |
| | C | 3.1 | 2.3 | 3.1 | 3.1 | 3.1 | 2.2 | 2.5 | 2.2 |
| Surface tension of inks set at respective positions (mN/m) | Y | 39.7 | 39.8 | 39.7 | 39.8 | 36.7 | 38.0 | 39.7 | 40.0 |
| | M | 39.4 | 39.7 | 39.5 | 39.7 | 39.7 | 36.7 | 39.8 | 39.8 |
| | C | 39.8 | 39.4 | 39.8 | 39.5 | 38.0 | 39.7 | 39.0 | 39.7 |

Evaluation of Color Mixing of Ink Set Constituted of Three Types of Inks

Three types of ink cartridges respectively filled with the inks constituting the ink set were mounted to a modified machine of an ink jet recording apparatus (trade name: BJ F900; manufactured by CANON INC.) whose recording head the inks were to be ejected from by the action of thermal energy. This ink jet recording apparatus was one which performed recording in one pass and one direction, in which the number of ejection orifices forming the ejection orifice lines of the recording head was 512 for each color, the width between the respective ejection orifice lines was 0.43 inches, and the ejection volume per ink droplet was about 4.5 pL (picoliters). The ejection orifice lines of the recording head were set up so that the yellow, magenta, cyan, light-magenta, light-cyan and black inks were ejected in this sequence from the right side upon facing the surface of the recording head in which the ejection orifice lines were formed. The ink jet recording apparatus was one in which the ejection orifice lines which ejected these inks were capped with the same cap, thereby performing a cleaning operation.

The ink cartridges storing the inks constituting the ink set were set respectively at the positions of yellow (Y), magenta (M) and cyan (C) of the ink jet recording apparatus, as shown in the lower column of Table 2. Thus, the ejection orifices of the inks constituting the ink set were so set as to be adjacent to one another, i.e., the inks set at the position Y and position M and the inks set at the position M and position C were so set respectively as to be adjacent to each other. Professional Photopaper PR-101 (available from CANON INC.) was used as the recording mediums.

Two sheets of recorded matter were prepared in which solid images (100% duty) of 4 cm×27 cm formed on the recording mediums using each of the inks constituting the ink set were so recorded as to be adjacent to each other. Then, the cleaning operation was performed once, and thereafter the recording was stopped for 10 minutes. After that, preliminary ejection of 16,000 ink droplets per each ejection orifice was performed. Thereafter, one sheet of the same recorded matter as in the above was again prepared to ascertain the color mixing state of the solid images in the recorded matter.

Where color mixing on the images was observed, the cleaning operation was again performed once and thereafter the recording was stopped for 10 minutes. Then, preliminary ejection of 2,000 ink droplets per each ejection orifice was performed, and thereafter one sheet of the same recorded matter as in the above was again prepared to ascertain the color mixing state of the solid images in the recorded matter.

Where color mixing was still observed on the images in the recorded matter obtained as above, the following operation was repeatedly performed until color mixing on the solid images was no longer observed. That is, the steps of making the cleaning operation, stopping recording for 10 minutes, performing the preliminary ejection in the predetermined number of ink droplets and preparing one sheet of recorded matter were repeated in the same way as in the above except that the number of preliminary ejection droplets per each ejection orifice was increased by 2,000 ink droplets every time the above steps were repeated.

Further, the steps of preparing two sheets of recorded matter, performing the cleaning operation, stopping the recording for a predetermined period of time and preparing one sheet of recorded matter were repeated twice in the same way as in the above except that the time periods for which the recording was stopped after the cleaning operation had been performed were changed to 30 minutes and 60 minutes, respectively.

In the second sheet of recorded matter prepared before the cleaning operation was performed, it was ascertained that color mixing on the solid images did not occur in all the cases.

The number of preliminary ejection droplets ejected until color mixing on the solid images was not observed in the initially recorded area and the vicinity thereof was counted to make an evaluation. Evaluation criteria of color mixing are as shown below. The evaluation results are shown in Table 3.

Evaluation criteria of color mixing:

A: Color mixing disappeared when the number of preliminary ejection droplets for each ejection orifice was more than 16,000 and 18,000 or less.

B: Color mixing disappeared when the number of preliminary ejection droplets for each ejection orifice was more than 18,000 and 20,000 or less.

C: Color mixing disappeared when the number of preliminary ejection droplets for each ejection orifice was more than 20,000 ink droplets and 22,000 or less.

D: Color mixing disappeared when the number of preliminary ejection droplets for each ejection orifice was more than 22,000 and 24,000 or less.

E: Color mixing was observed even when the number of preliminary ejection droplets for each ejection orifice was more than 24,000.

Evaluation of Ejection Stability

Three types of ink cartridges filled respectively with the inks constituting the ink set were set in the same ink jet recording apparatus as in the above in the same manner as in the above evaluation of color mixing. OFFICE PLANNER (available from CANON INC.) was used as the recording mediums. On the recording mediums, using 1,000 sheets of recorded matter were prepared in which solid images (100% duty) of 4 cm×27 cm formed on the recording medium using each of the inks constituting the ink set were so recorded as to be adjacent to each other. Then, the state of the recorded matter obtained was visually observed to make an evaluation. Evaluation criteria of ejection stability are as shown below. The evaluation results are shown in Table 3.

Evaluation criteria of ejection stability:

A: Image non-uniformity such as lines was not observed on all the 1,000 sheets of recorded matter, and there was no problem in ejection stability.

B: Lines were somewhat observed on some sheets of recorded matter, but at a level which raised no problem in practical use.

Evaluation of Storage Stability

The viscosity of the inks constituting the ink set and the particle diameter of pigments were measured. Thereafter, the inks were placed in shot bottles, and the bottles were tightly closed. Then, these shot bottles were stored for one month in a 60° C. oven. Thereafter, the shot bottles were taken out of the oven, and the viscosity of inks and the particle diameter of pigments were measured. The viscosity of inks and the particle diameter of pigments before and after the storage at 60° C. were compared to make an evaluation. Evaluation criteria of storage stability are as shown below. The evaluation results are shown in Table 3.

A: The viscosity and the particle diameter were hardly changed before and after the storage at 60° C.

B: The viscosity and the particle diameter somewhat increased before and after the storage at 60° C., but was at a level which raised no problem in practical use.

TABLE 3

|  |  | Example |  |  |  |  | Comparative Example |  |  |  |  |  |  |  |  |  | Reference Example |  |
|---|---|---|---|---|---|---|---|---|---|---|---|---|---|---|---|---|---|---|
|  |  | 1 | 2 | 3 | 4 | 5 | 1 | 2 | 3 | 4 | 5 | 6 | 7 | 8 | 9 | 10 | 1 | 2 |
| First-ink color mixing: | After 10 minutes | A | B | A | A | A | D | A | D | A | D | A | D | A | C | A | A | A |
|  | After 30 minutes | B | C | B | B | B | D | A | E | A | D | A | D | A | D | A | A | A |
|  | After 60 minutes | B | C | B | B | B | E | A | E | A | E | A | E | A | D | A | A | A |
| Second-ink color mixing: | After 10 minutes | A | A | A | A | A | A | D | A | D | A | D | A | D | A | C | A | A |
|  | After 30 minutes | A | A | B | B | A | A | D | A | E | A | E | A | D | A | D | A | A |
|  | After 60 minutes | A | A | B | B | A | A | E | A | E | A | E | A | E | A | D | A | A |
| Third-ink color mixing: | After 10 minutes | A | A | A | A | A | A | A | A | A | A | A | A | A | A | A | A | A |
|  | After 30 minutes | A | A | A | A | A | A | A | A | A | B | A | A | A | A | A | A | A |
|  | After 60 minutes | A | A | A | A | A | A | A | A | A | B | A | A | A | A | A | A | A |
| Ejection stability: | First ink | A | A | A | A | A | A | A | A | A | A | A | A | A | A | A | A | A |
|  | Second ink | A | A | A | A | A | A | A | A | A | A | A | A | A | A | A | A | A |
|  | Third ink | A | A | A | A | A | A | A | A | A | A | A | A | A | A | A | B | A |
| Storage stability: | First ink | A | A | A | A | A | A | A | A | A | A | A | A | A | A | A | A | B |
|  | Second ink | A | A | A | A | A | A | A | A | A | A | A | A | A | A | A | A | A |
|  | Third ink | A | A | A | A | A | A | A | A | A | A | A | A | A | A | A | A | A |

Production of Ink Set Constituted of Four Types of Inks

The inks obtained as described above were used in such combinations as shown in the upper column of Table 4 shown below, to make up ink sets of Examples 1 to 6 and Comparative Examples 11 to 21. The inks constituting each of the ink sets were filled into the ink cartridge constructed as shown in FIG. 8. The ink cartridge constructed as shown in FIG. 8 had the ink storage portion which was brought into a hermetically-closed state, i.e., had the ink storage portion in which the ink came into contact with the atmosphere only through the ink supply opening. Each of the inks was filled into each of the ink cartridges in the following quantities based on the maximum fill in which each of the inks could be filled into each of the ink cartridges. The first ink was filled in a half quantity based on the maximum fill of the ink cartridge, and each of the second ink, the third ink 1 and the third ink 2 was filled in the maximum quantity of each of the ink cartridges. The fill of each of the inks constituting the ink set was set as above so that the differences of the ripples in the recording head were more easily brought about. At the lower column of Table 4, various values of the inks constituting the ink set are shown together.

TABLE 4

|  |  | Example | Comparative Example |  |  |  |  |
|---|---|---|---|---|---|---|---|
|  |  | 6 | 11 | 12 | 13 | 14 | 15 |
| First ink (ink with largest specific gravity) |  | 11 | 11 | 11 | 11 | 11 | 11 |
| Second ink (ink with smallest specific gravity) |  | 3 | 3 | 3 | 3 | 3 | 3 |
| Third ink 1 (ink with intermediate specific gravity) |  | 1 | 1 | 1 | 1 | 1 | 1 |
| Third ink 2 (ink with intermediate specific gravity) |  | 2 | 2 | 2 | 2 | 2 | 2 |
| Specific gravity of first ink (-) |  | 1.079 | 1.079 | 1.079 | 1.079 | 1.079 | 1.079 |
| Specific gravity of second ink (-) |  | 1.030 | 1.030 | 1.030 | 1.030 | 1.030 | 1.030 |
| Specific gravity of third ink 1 (-) |  | 1.058 | 1.058 | 1.058 | 1.058 | 1.058 | 1.058 |
| Specific gravity of third ink 2 (-) |  | 1.044 | 1.044 | 1.044 | 1.044 | 1.044 | 1.044 |
| Inks set at respective positions | Y | First | First | First | First | First | First |
|  | M | Third 1 | Third 1 | Third 2 | Third 2 | Second | Second |
|  | C | Third 2 | Second | Third 1 | Second | Third 1 | Third 2 |
|  | LM | Second | Third 2 | Second | Third 1 | Third 2 | Third 1 |
| Specific gravity of inks set at respective positions (-) | Y | 1.079 | 1.079 | 1.079 | 1.079 | 1.079 | 1.079 |
|  | M | 1.058 | 1.058 | 1.044 | 1.044 | 1.030 | 1.030 |
|  | C | 1.044 | 1.030 | 1.058 | 1.030 | 1.058 | 1.044 |
|  | LM | 1.030 | 1.044 | 1.030 | 1.058 | 1.044 | 1.058 |
| Difference in specific gravity between inks set at positions Y and M (-) |  | 0.021 | 0.021 | 0.035 | 0.035 | 0.049 | 0.049 |
| Difference in specific gravity between inks set at positions M and C (-) |  | 0.014 | 0.028 | 0.014 | 0.014 | 0.028 | 0.014 |
| Difference in specific gravity between inks set at positions C and LM (-) |  | 0.014 | 0.014 | 0.028 | 0.028 | 0.014 | 0.014 |
| Total sum of differences in specific gravity (-) |  | 0.049 | 0.063 | 0.077 | 0.077 | 0.091 | 0.077 |
| Viscosity of inks set at respective positions (mPa·s) | Y | 4.0 | 4.0 | 4.0 | 4.0 | 4.0 | 4.0 |
|  | M | 3.8 | 3.8 | 3.1 | 3.1 | 2.2 | 2.2 |
|  | C | 3.1 | 2.2 | 3.8 | 2.2 | 3.8 | 3.1 |
|  | LM | 2.2 | 3.1 | 2.2 | 3.8 | 3.1 | 3.8 |
| Surface tension of inks set at respective positions (mN/m) | Y | 39.5 | 39.5 | 39.5 | 39.5 | 39.5 | 39.5 |
|  | M | 39.7 | 39.7 | 39.8 | 39.8 | 39.7 | 39.7 |

TABLE 4-continued

|  |  |  |  |  |  |  |
|---|---|---|---|---|---|---|
| C | 39.8 | 39.7 | 39.7 | 39.7 | 39.7 | 39.8 |
| LM | 39.7 | 39.8 | 39.7 | 39.7 | 39.8 | 39.7 |

|  |  | Comparative Example | | | | | |
|---|---|---|---|---|---|---|---|
|  |  | 16 | 17 | 18 | 19 | 20 | 21 |
| First ink (ink with largest specific gravity) | | 11 | 11 | 11 | 11 | 11 | 11 |
| Second ink (ink with smallest specific gravity) | | 3 | 3 | 3 | 3 | 3 | 3 |
| Third ink 1 (ink with intermediate specific gravity) | | 1 | 1 | 1 | 1 | 1 | 1 |
| Third ink 2 (ink with intermediate specific gravity) | | 2 | 2 | 2 | 2 | 2 | 2 |
| Specific gravity of first ink (-) | | 1.079 | 1.079 | 1.079 | 1.079 | 1.079 | 1.079 |
| Specific gravity of second ink (-) | | 1.030 | 1.030 | 1.030 | 1.030 | 1.030 | 1.030 |
| Specific gravity of third ink 1 (-) | | 1.058 | 1.058 | 1.058 | 1.058 | 1.058 | 1.058 |
| Specific gravity of third ink 2 (-) | | 1.044 | 1.044 | 1.044 | 1.044 | 1.044 | 1.044 |
| Inks set at respective positions | Y | Third 1 | Third 1 | Third 2 | Third 2 | Second | Second |
|  | M | First | First | First | First | First | First |
|  | C | Third 2 | Second | Third 1 | Second | Third 1 | Third 2 |
|  | LM | Second | Third 2 | Second | Third 1 | Third 2 | Third 1 |
| Specific gravity of inks set at respective positions (-) | Y | 1.058 | 1.058 | 1.044 | 1.044 | 1.030 | 1.030 |
|  | M | 1.079 | 1.079 | 1.079 | 1.079 | 1.079 | 1.079 |
|  | C | 1.044 | 1.030 | 1.058 | 1.030 | 1.058 | 1.044 |
|  | LM | 1.030 | 1.044 | 1.030 | 1.058 | 1.044 | 1.058 |
| Difference in specific gravity between inks set at positions Y and M (-) | | 0.021 | 0.021 | 0.035 | 0.035 | 0.049 | 0.049 |
| Difference in specific gravity between inks set at positions M and C (-) | | 0.035 | 0.049 | 0.021 | 0.049 | 0.021 | 0.035 |
| Difference in specific gravity between inks set at positions C and LM (-) | | 0.014 | 0.014 | 0.028 | 0.028 | 0.014 | 0.014 |
| Total sum of differences in specific gravity (-) | | 0.070 | 0.084 | 0.084 | 0.112 | 0.084 | 0.098 |
| Viscosity of inks set at respective positions (mPa·s) | Y | 3.8 | 3.8 | 3.1 | 3.1 | 2.2 | 2.2 |
|  | M | 4.0 | 4.0 | 4.0 | 4.0 | 4.0 | 4.0 |
|  | C | 3.1 | 2.2 | 3.8 | 2.2 | 3.8 | 3.1 |
|  | LM | 2.2 | 3.1 | 2.2 | 3.8 | 3.1 | 3.8 |
| Surface tension of inks set at respective positions (mN/m) | Y | 39.7 | 39.7 | 39.8 | 39.8 | 39.7 | 39.7 |
|  | M | 39.5 | 39.5 | 39.5 | 39.5 | 39.5 | 39.5 |
|  | C | 39.8 | 39.7 | 39.7 | 39.7 | 39.7 | 39.8 |
|  | LM | 39.7 | 39.8 | 39.7 | 39.7 | 39.8 | 39.7 |

Evaluation of Ink Set Constituted of Four Types of Inks

Four types of ink cartridges filled respectively with the inks constituting the ink set were mounted to a modified machine of an ink jet recording apparatus (trade name: BJ F900; manufactured by CANON INC.) whose recording head the inks were to be ejected from by the action of thermal energy. This ink jet recording apparatus was one which performed recording in one pass and one direction, in which the number of ejection orifices forming the ejection orifice lines of the recording head was 512 for each color, the width between the respective ejection orifice lines was 0.43 inches, and the ejection volume per ink droplet was about 4.5 pL (picoliters). The ejection orifice lines of the recording head were set up so that the yellow, magenta, cyan, light-magenta, light-cyan and black inks were ejected in this sequence from the right side upon facing the surface of the recording head in which the ejection orifice lines were formed. The ink jet recording apparatus was one in which the ejection orifice lines which ejected these inks were capped with the same cap, thereby performing cleaning operation.

The ink cartridges storing the inks constituting the ink set were set respectively at the positions of yellow (Y), magenta (M), cyan (C) and light magenta (LM) of the ink jet recording apparatus, as shown in the lower column of the above Table 4. Thus, the ejection orifices of the inks constituting the ink set were so set as to be adjacent to one another. Specifically, the inks placed at the position Y and position M, the inks placed at the position M and position C and the inks placed at the position C and position LM were so set respectively as to be adjacent to each other.

Color mixing, ejection stability and storage stability were evaluated in the same manner, and according to the same evaluation criteria, as in the above. The evaluation results are shown in Table 5.

TABLE 5

|  |  | Example | Comparative Example | | | | | | | | | | |
|---|---|---|---|---|---|---|---|---|---|---|---|---|---|
|  |  | 6 | 11 | 12 | 13 | 14 | 15 | 16 | 17 | 18 | 19 | 20 | 21 |
| First-ink color mixing: | After 10 minutes | B | B | D | D | E | E | D | E | D | E | E | E |
|  | After 30 minutes | C | C | E | E | E | E | E | E | E | E | E | E |
|  | After 60 minutes | C | C | E | E | E | E | E | E | E | E | E | E |

TABLE 5-continued

|  |  | Example | Comparative Example | | | | | | | | | | |
|---|---|---|---|---|---|---|---|---|---|---|---|---|---|
|  |  | 6 | 11 | 12 | 13 | 14 | 15 | 16 | 17 | 18 | 19 | 20 | 21 |
| Second-ink color mixing: | After 10 minutes | A | A | A | A | A | A | A | A | A | A | A | A |
|  | After 30 minutes | A | A | A | A | A | A | A | A | A | A | A | A |
|  | After 60 minutes | A | A | A | A | A | A | A | A | A | A | A | A |
| Third-ink 1 color mixing: | After 10 minutes | A | D | D | D | D | A | B | B | D | D | B | A |
|  | After 30 minutes | A | D | D | D | D | A | C | C | D | D | C | A |
|  | After 60 minutes | A | E | E | E | E | A | C | C | E | E | C | A |
| Third-ink 2 color mixing: | After 10 minutes | A | A | A | A | A | A | A | A | A | A | A | A |
|  | After 30 minutes | A | A | A | A | A | A | A | A | A | A | A | A |
|  | After 60 minutes | A | A | A | A | A | A | A | A | A | A | A | A |
| Ejection stability: | First ink | A | A | A | A | A | A | A | A | A | A | A | A |
|  | Second ink | A | A | A | A | A | A | A | A | A | A | A | A |
|  | Third ink 1 | A | A | A | A | A | A | A | A | A | A | A | A |
|  | Third ink 2 | A | A | A | A | A | A | A | A | A | A | A | A |
| Storage stability: | First ink | A | A | A | A | A | A | A | A | A | A | A | A |
|  | Second ink | A | A | A | A | A | A | A | A | A | A | A | A |
|  | Third ink 1 | A | A | A | A | A | A | A | A | A | A | A | A |
|  | Third ink 2 | A | A | A | A | A | A | A | A | A | A | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-172715, filed Jun. 22, 2006, which is hereby incorporated by reference herein in its entirety.

What is claimed is:

1. A recording unit comprising:
   (i) ink cartridges each having a single ink storage portion that stores a respective one of a plurality of inks constituting an ink set; and
   (ii) a recording head having ejection orifice lines each of which ejects a respective one of the plurality of inks,
   wherein each of the ink storage portions communicates with the atmosphere only through an ink supply opening,
   wherein at least three types of inks among the plurality of inks are different in specific gravity from one another,
   wherein at least two types of inks among the at least three types of inks are different in specific gravity by 0.020 or more, and
   wherein the arrangement of ejection orifice lines corresponds to an arrangement of the plurality of inks, and the plurality of the inks are arranged so that, among all arrangements of the inks, the arrangement of the inks is selected that has the smallest total sum of differences in specific gravities between the inks to be ejected from ejection orifice lines adjacent to each other among the plurality of inks to be ejected from the ejection orifice lines.

2. The recording unit according to claim 1, wherein the inks to be ejected from ejection orifice lines adjacent to each other among the plurality of inks are different in specific gravity by less than 0.020.

3. The recording unit according to claim 1, wherein in the inks to be ejected from ejection orifice lines adjacent to each other among the plurality of inks, the ink having a relatively large specific gravity has a viscosity larger than a viscosity of the ink having a relatively small specific gravity.

4. The recording unit according to claim 1, wherein in the inks to be ejected from ejection orifice lines adjacent to each other among the plurality of inks, the ink having a relatively large specific gravity has a surface tension smaller than a surface tension of the ink having a relatively small specific gravity.

5. The recording unit according to claim 1, wherein the ejection orifice lines which eject at least three types of inks, including two types of inks different in specific gravity by 0.020 or more among the plurality of inks, are capped with the same cap.

6. An ink jet recording apparatus comprising the recording unit according to claim 1.

7. An ink jet recording method which utilizes the recording unit of claim 1, wherein a plurality of inks constituting an ink set by an ink jet method are ejected from the recording head of the recording unit.

8. The recording unit according to claim 1, wherein the plurality of inks each have a surface tension of 25.0 mN/m or more and 50.0 mN/m or less.

9. The recording unit according to claim 1, wherein the plurality of inks each have a specific gravity of 1.030 or more and 1.100 or less.

10. The recording unit according to claim 1, wherein a coloring material of each of the plurality of inks is a pigment.

* * * * *